:::{.flushright}

:::

(12) United States Patent
Labelle

(10) Patent No.: US 7,439,881 B2
(45) Date of Patent: Oct. 21, 2008

(54) METHOD AND DEVICE FOR DETERMINING AT LEAST ONE MULTIMEDIA DATA ENCODING PARAMETER

(75) Inventor: Lilian Labelle, St Samson sur Rance (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/933,847

(22) Filed: Nov. 1, 2007

(65) Prior Publication Data

US 2008/0079613 A1    Apr. 3, 2008

Related U.S. Application Data

(62) Division of application No. 10/495,920, filed as application No. PCT/IB02/05281 on Nov. 21, 2002, now Pat. No. 7,355,530.

(30) Foreign Application Priority Data

Nov. 21, 2001  (FR)  .................................. 01 15092
Nov. 21, 2001  (FR)  .................................. 01 15093

(51) Int. Cl.
    *H03M 7/34*    (2006.01)
(52) U.S. Cl. .......................... 341/51; 709/224; 709/231
(58) Field of Classification Search ............ 375/240.01, 375/240.03, 240.12, 240.13, 240.16, 240.24, 375/240.27; 341/51; 709/224, 228, 231–233; 725/86–87
See application file for complete search history.

(56) References Cited

U.S. PATENT DOCUMENTS 4,661,857 A   4/1987  Kondo .................... 358/439

5,260,783 A   11/1993 Dixit .................... 375/240.13

(Continued)

FOREIGN PATENT DOCUMENTS

EP      0 912 063 A2    4/1999

(Continued)

OTHER PUBLICATIONS

Ranga S. Ramanujan et al., "Adaptive Streaming of MPEG Video Over IP Networks," *Proceedings, 22nd Annual Conference in Minneapolis, IEEE Comput. Soc.*, pp. 398-409 (1997).

(Continued)

*Primary Examiner*—Khai M Nguyen
(74) *Attorney, Agent, or Firm*—Fitzpatrick, Cella, Harper & Scinto

(57) ABSTRACT

The invention concerns a method of determining at least one parameter for encoding multimedia digital data organized in elementary units of data intended to be encoded according to at least one encoding mode, wherein said method comprises the following steps:—determining at least one elementary magnitude which is representative of the resources needed for decoding each elementary data unit encoded according to a different encoding mode,—determining at least one total magnitude which is representative of the resources needed for decoding a plurality of elementary data units encoded as a function on the one hand of the at least one elementary magnitude previously determined and on the other hand the number of elementary units encoded according to each of the encoding modes,—deciding with regard to the determination of at least one data encoding parameter as a function of the at least one total magnitude previously determined and a predetermined magnitude.

2 Claims, 8 Drawing Sheets

U.S. PATENT DOCUMENTS

| | | | | |
|---|---|---|---|---|
| 5,398,072 | A | 3/1995 | Auld | 375/240.25 |
| 5,533,021 | A | 7/1996 | Branstad et al. | 370/396 |
| 5,757,968 | A | 5/1998 | Ando | 382/240.13 |
| 5,825,425 | A | 10/1998 | Kazui et al. | 375/240.24 |
| 5,952,943 | A | 9/1999 | Walsh et al. | 341/50 |
| 5,963,673 | A | 10/1999 | Kodama et al. | 382/239 |
| 6,222,886 | B1 | 4/2001 | Yogeshwar | 375/240.23 |
| 6,259,736 | B1 | 7/2001 | Chujoh et al. | 375/240.13 |
| 6,441,754 | B1 | 8/2002 | Wang et al. | 341/150 |
| 6,449,719 | B1 | 9/2002 | Baker | 713/168 |
| 6,542,549 | B1 | 4/2003 | Tan et al. | 375/240.26 |
| 6,563,875 | B2 | 5/2003 | Auvray et al. | 375/240.13 |
| 6,594,699 | B1 * | 7/2003 | Sahai et al. | 709/228 |
| 6,792,046 | B2 | 9/2004 | Hatano et al. | 375/240.24 |
| 6,876,703 | B2 | 4/2005 | Ismaeil et al. | 375/240.16 |
| 7,054,364 | B2 | 5/2006 | Kawashima | 375/240.13 |
| 7,219,163 | B2 * | 5/2007 | Robinson et al. | 709/246 |
| 2002/0015444 | A1 | 2/2002 | Suzuki et al. | 375/240.02 |
| 2002/0105951 | A1 | 8/2002 | Hannuksela et al. | 370/389 |
| 2002/0176629 | A1 | 11/2002 | Labelle | 382/232 |
| 2004/0006644 | A1 | 1/2004 | Henocq et al. | 709/246 |

FOREIGN PATENT DOCUMENTS

EP  0 994 627 A2  4/2000

OTHER PUBLICATIONS

J. Valentim et al., "Evaluating MPEG-4 Video Decoding complexity," *Proceedings of Workshop and Exhibition on MPEG-4*, pp. 29-32 (2001).

Hugh M. Smith et al., "A Feedback Based Rate Control Algorithm for Multicast Transmitted Video Conferencing," *Journal of High Speed Networks*, vol. 7, No. 3-4, pp. 259-279 (1998).

R. Mohan et al., "Adapting Multimedia Internet Content for Universal Access," IEEE Transactions on Multimedia, vol. 1, No. 1, pp. 104-114, Mar. 1999.

E. Feig, "Fast Algorithms for the Discrete Cosine Transform", IEEE Transactions on Signal Processing, vol. 40, No. 9, pp. 2174-2193, Sep. 1992.

Information Technology—Coding of Audio-Visual Objects Part 2: Visual, ISO/IEC JTC 1/SC 29/WG11 N3056, pp. 1-459, Dec. 2000.

L. Difdier et al., "On-Line Motion Detection", LIM University of Provence, pp. 1-10, Dec. 1996.

* cited by examiner

METHOD AND DEVICE FOR DETERMINING AT LEAST ONE MULTIMEDIA DATA ENCODING PARAMETER

CROSS-REFERENCE TO RELATED APPLICATIONS

This application is a divisional of U.S. patent application Ser. No. 10/495,920, U.S. Pat. No. 7,355,530 filed Oct. 4, 2004, the entire contents of which are incorporated herein by reference.

The present invention concerns a method and a device for determining at least one parameter for encoding digital multimedia data organized in elementary units of data intended to be encoded according to at least one encoding mode.

Technological advances in digital communication apparatus such as television sets, pocket microcomputers, conventional microcomputers or any other miniaturized apparatus are such that, in future years, it will very probably be possible to exchange data of a multimedia type and, for example, audio and/or video between these different apparatus.

Market studies show, moreover, that users are ready to purchase such communication apparatus provided that the price is not too excessive and, in particular, that the services rendered are of good quality.

Following the identification of this new market, many studies have been carried out concerning the miniaturization of electronic components, so as to obtain apparatus with high memory and computational capacities.

In addition, many standardization bodies have produced standards for unifying data exchanges between these apparatus with different characteristics. These standards, such as those of the IEEE 802 family, allow both the implementation and the management of the transfer of data via a particular network.

IEEE 802.11 and its European counterpart HYPERLAN are dedicated to wireless local area networks. These are being particularly studied at the present time since they are broadband networks making it possible to transmit audio and/or video data between two machines which are geographically dose.

These standards are therefore particularly adapted for developing wireless local area networks within dwellings.

The technical solutions currently being studied in the context of the above mentioned standards applied to home area networks permit wireless transmission of digital data either between a so-called server machine and a so-called client machine (point to point transmission), or between the server and a group of clients, or between the server and several clients (multipoint communication).

In this environment, the data are stored on the server, which centralizes all the communications with the client or clients. This server can also serve as a gateway with the outside world (Internet, television, camcorder etc).

It should be noted that home area networks can be of a heterogeneous nature, that is to say they can, for example, consist partly of wireless connections and partly of cabled connections.

Though many projects are studying the implementation of services around interactive television and the exchange of information on the internet, few of them are dealing with the problems related to the use of home area networks, namely the production of solutions for obtaining an acceptable service quality.

The server being connected to the outside world, the data stored are of various sizes. The conveyance of these data through a local area network is not a service which is easy to implement.

A communication system is known from the article "Adapting Multimedia Internet Content for Universal Access" by R. Mohan, J. Smith, C-S. Li, IEEE Transactions on Multimedia, March 1999, which makes provision for setting up a database listing the different categories of communication apparatus which can be connected to a server.

For each category of apparatus, the system takes into account the size of the display screen in this category of apparatus and the depth of colors which the apparatus can support (the number of bits per color component).

Finally, the system produces in advance, for each category of apparatus and for each of the above-mentioned characteristics, an encoded version for each of the videos which a given apparatus may request from the server.

These encoded versions are then stored by the server.

Thus, when one of the apparatus sends a request to the server, the system selects from the database the pre-encoded version of the data adapted to the category of the apparatus and to the aforementioned characteristics.

Such a system has several drawbacks.

This is because the system must perform many calculations in order to produce the different encoded versions, thus requiring high computational power and monopolizing the central processing unit for a relatively long time.

Moreover, setting up such a database requires the use of memories with high storage capacities.

In addition, the system described above is frozen in that it cannot take account of a communication apparatus in a new category which is not listed in its database.

Taking account of a request emanating from a new category of apparatus would for example necessitate listing this apparatus in the database and, to do this, producing encoded versions of the different videos, in a manner adapted to the characteristics referred to above (the size of the screen and the depth of colors).

However, this taking into account would also tend to lead to increasing the memory capacity of the system.

The present invention makes provision for remedying at least one of the aforementioned drawbacks by proposing a novel method and a novel device for determining at least one multimedia digital data encoding parameter which are such that the encoding parameter is determined in a manner adapted according to a predetermined magnitude which is a characteristic of the resources needed for the decoding of data and which serves as a threshold or reference.

In determining one or more encoding parameters in an appropriate fashion, the data encoded with this parameter or parameters require for their decoding resources corresponding to a magnitude which is less than or equal to a predetermined magnitude.

The object of the present invention is thus a method of determining at least one parameter for encoding multimedia digital data organized in elementary units of data intended to be encoded according to at least one encoding mode, wherein said method comprises the following steps:

determining at least one elementary magnitude which is representative of the resources needed for decoding each elementary data unit encoded according to a different encoding mode, determining at least one total magnitude which is representative of the resources needed for decoding a plurality of elementary data units encoded as a function on the one hand of the at least one elementary magnitude previously determined and on the other hand the number of elementary units encoded according to each of the encoding modes, deciding with regard to the determination of at least one data encoding parameter as a function of the at least one total magnitude previously determined and a predetermined magnitude.

In a complementary manner, the invention relates to a device for determining at least one parameter for encoding multimedia digital data organized in elementary units of data intended to be encoded according to at least one encoding mode, wherein said device comprises:

means for determining at least one elementary magnitude which is representative of the resources needed for decoding each elementary data unit encoded according to a different encoding mode, means for determining at least one total magnitude which is representative of the resources needed for decoding a plurality of elementary data units encoded as a function on the one hand of the at least one elementary magnitude previously determined and on the other hand the number of elementary units encoded according to each of the encoding modes, means for deciding with regard to the determination of at least one data encoding parameter as a function of the at least one total magnitude previously determined and a predetermined magnitude.

It is to be noted that the decoding of data encoded according to a different encoding mode is characterized by a magnitude which is representative of the resources (computational capacity or memory capacity) allocated to such a decoding.

To determine such a magnitude is a way to determine the resources which are needed, e.g. in a communication apparatus, to be able to decode encoded data.

Thus, by determining a total magnitude which is representative of the resources needed for the decoding of a plurality of elementary encoded data units, the invention makes it possible to decide on the choice of the encoding parameter or parameters adapted to a predetermined magnitude.

Because of this, the encoding parameter or parameters thus determined make it possible to encode the data so that these encoded data give rise, for example, to a total magnitude representative of the resources needed for the decoding of a plurality of elementary data units encoded which is less than or equal to the predetermined magnitude.

For example, the encoding parameter used for the encoding of data before determining the total magnitude may prove to be satisfactory or not in the light of the predetermined magnitude. If this parameter is not satisfactory, it will then be necessary to determine a parameter which, this time, will be adapted to the predetermined magnitude.

It should be noted that, if an encoding parameter is adjusted according to the predetermined magnitude, it is because a modification to that parameter has an influence on the resources which are needed for the decoding of the data encoded with said parameter.

The invention does not require a high storage capacity as in the aforementioned prior art since several versions of data encoded according to different categories of communication apparatus are not stored in advance.

In addition, the processing unit of the device according to the invention is not monopolized by long calculations for a relatively long time, as is the case with the system of the prior art, which has to set up a database of preencoded versions.

According to one feature, the elementary magnitude is the number of operations to be performed in order to decode each encoded elementary data unit, the total magnitude being the total number of operations to be performed during a predetermined interval of time in order to decode a plurality of encoded elementary data units.

According to another feature, the elementary magnitude is the elementary memory capacity necessary for decoding each encoded elementary data unit the total magnitude being the total memory capacity necessary for the decoding of a given number of encoded elementary data units.

Thus, one of the two above-mentioned magnitudes or both magnitudes can be taken into account to determine the resources which are needed for decoding a plurality of elementary data units encoded according to one or more encoding modes.

According to a first aspect, the present invention concerns a method of determining at least one parameter for encoding multimedia digital data organized in elementary units of data intended to be encoded according to at least one encoding mode, characterized in that said method comprises the following steps:

determining an elementary memory capacity necessary for decoding each elementary data unit encoded according to a different encoding mode, determining a total memory capacity necessary for the decoding of a given number of elementary data units encoded as a function, on the one hand, of at least one elementary memory capacity determined for the decoding of an elementary unit of data encoded according to an encoding mode, and on the other hand, of the number of elementary units of data encoded according to each of the encoding modes, deciding with regard to the determination of at least one parameter for encoding the data as a function of the total memory capacity previously determined and a predetermined memory capacity.

In a complementary manner, the invention relates to a device for determining at least one parameter for encoding multimedia digital data organized in elementary data units intended to be encoded according to at least one encoding mode, characterized in that said device comprises:

means for determining an elementary memory capacity necessary for the decoding of each elementary data unit encoded according to a different encoding mode, means for determining a total memory capacity necessary for the decoding of a given number of elementary data units encoded as a function, on the one hand, of at least one elementary memory capacity determined for the decoding of an elementary unit of data encoded according to an encoding mode, and on the other hand, of the number of elementary units of data encoded according to each of the encoding modes, means for deciding with regard to the determination of at least one parameter for encoding the data as a function of the total memory capacity previously determined and a predetermined memory capacity.

Thus, by determining the total memory capacity necessary for the decoding of a plurality of elementary encoded data units, the invention makes it possible to decide on the choice of the encoding parameter or parameters adapted to a predetermined memory capacity.

Because of this, the encoding parameter or parameters thus determined make it possible to encode the data so that these encoded data require for their decoding, for example, a total memory capacity less than or equal to the predetermined memory capacity.

For example, the encoding parameter which was used for the encoding of the data before determining the total memory capacity may prove to be satisfactory or not in the light of the predetermined total memory capacity. If this parameter is not satisfactory, it will then be necessary to determine a parameter which, this time, will be adapted to the predetermined total memory capacity.

It should be noted that, if an encoding parameter is adjusted according to the predetermined total memory capacity, it is because a modification to that parameter has an influence on the total memory capacity necessary for the decoding of the data encoded with said parameter.

The invention does not require a high storage capacity as in the aforementioned prior art since several versions of data encoded according to different categories of communication apparatus are not stored in advance.

In addition, the processing unit of the device according to the invention is not monopolized by long calculations for a relatively long time, as is the case with the system of the prior art, which has to set up a database of pre-encoded versions.

More particularly, when several encoding modes are used for the encoding of the given number of elementary data units, the step of determining the total memory capacity is more particularly carried out as a function, on the one hand, of the elementary memory capacity determined for the decoding of each elementary unit of data encoded according to a different encoding mode, and on the other hand, of the number of elementary data units encoded according to each of the encoding modes.

According to another approach, when several encoding modes are used for the encoding of the given number of elementary data units, said method comprises a supplementary step of selecting the highest elementary memory capacity among the different elementary memory capacities determined for each of the encoding modes.

According to this approach, the step of determining the total memory capacity is more particularly carried out as a function, on the one hand, of the highest elementary memory capacity already selected, and on the other hand, of the number of elementary data units encoded.

Thus, instead of taking into account, for each elementary unit, the corresponding elementary memory capacity which has been determined in relation to its own encoding mode, the most unfavorable case is considered by each time adopting the highest elementary memory capacity.

This makes it possible, on the one hand, to simplify the determination of the total memory capacity, and, on the other hand, to ensure that there will be no problem of data storage capacity at the time of the decoding operations.

In the case where the steps of determining the elementary memory capacity for each encoding mode, of determining the total memory capacity and of deciding are performed in a first communication apparatus connected to a second communication apparatus by a communication network, the invention adapts easily and dynamically to communication apparatus which are not yet connected to the first apparatus, but which can be connected thereto subsequently.

According to one feature, prior to the decision step, the method comprises a step of comparing a total memory capacity determined for the decoding of the given number of encoded elementary units with the memory capacity available in the second communication apparatus for the decoding of these data.

The predetermined memory capacity thus corresponds to that of the second communication apparatus.

The method according to the invention thus makes it possible to adapt the encoding of the data carried out in the first apparatus to the memory capacity available in the second apparatus.

According to another feature, prior to the comparison step, the method comprises a step of obtaining, by the first communication apparatus, the available memory capacity in the second communication apparatus.

Thus the information on the available memory capacity in the second communication apparatus is transmitted to the first apparatus before the comparison step referred to above.

If one or more communication apparatus are subsequently connected to the first apparatus, it suffices for the information on their respective memory capacities to be transmitted to the first apparatus for this to be able to adapt the encoding of the data in an appropriate manner for each apparatus.

According to a variant embodiment, the method further comprises the following steps:
 determining the elementary number of operations to be performed in order to decode each elementary data unit encoded according to a different encoding mode,
 determining the total number of operations to be performed during a predetermined interval of time in order to decode a plurality of elementary data units encoded as a function on the one hand of the elementary number previously determined and on the other hand of the number of elementary units encoded according to each of the encoding modes, Thus the decision with regard to the determination of the said at least one encoding parameter is also made as a function of the total number of operations previously determined and of a predetermined total number of operations.

According to one feature, the steps of determining the elementary number of operations, of determining the total number of operations during a predetermined interval of time and of deciding are performed in the first communication apparatus.

According to one feature, prior to the decision step, the method comprises a step of comparing between the total number of operations determined during the interval of time and the total number of operations which could be performed, during this same interval of time, in the second communication apparatus.

The predetermined decoding complexity thus corresponds to that of the second communication apparatus.

The method according to the invention thus also makes it possible to adapt the encoding of the data carried out in the first apparatus to the computational capacity of the second apparatus in addition to its total memory capacity.

According to another feature, prior to the comparison step, the method comprises a step of obtaining, by the first communication apparatus, the total number of operations which can be performed by the second communication apparatus during the predetermined interval of time.

Thus the information on the computational capacity of the second communication apparatus is transmitted to the first apparatus before the comparison step referred to above.

If one or more communication apparatus are subsequently connected to the first apparatus, it suffices for the information on their respective computational capacities to be transmitted to the first apparatus for this to be able to adapt the encoding of the data in an appropriate manner for each apparatus.

In addition, it is also possible to take a decision with regard to the determination of the encoding parameter or parameters by taking account of characteristics of the communication network such as the bandwidth available on this network.

According to one feature, the method comprises a step of estimating the quality of at least one elementary data unit by comparing said at least one elementary data unit encoded with the determined encoding parameter and said at least one non-encoded elementary data unit.

It is thus possible to produce a version of the elementary data unit adapted to the predetermined memory capacity and, possibly, to the predetermined decoding complexity and which makes it possible to obtain data, once decoded, of good quality, that is to say faithful to the non-encoded elementary data unit.

It should be noted that, in the case of a transmission of data between a first and second communication apparatus, it is thus possible to supply the second apparatus with a version of the elementary data unit of good quality adapted to the memory capacity available in the second apparatus, and possibly, to the computational capacity of the second apparatus.

According to another feature, when several encoding parameters have been determined, the method comprises the following steps:
estimating the quality of at least one elementary data unit for each determined combination of encoding parameters,
selecting the best quality among the different qualifies estimated for the different encoding parameters.

It is thus possible to select, by means of another criterion, a combination of encoding parameters among several possible combinations, in each of which one or more encoding parameters have been determined in a fashion adapted to the predetermined memory capacity and, possibly, to the predetermined decoding complexity.

According to yet another feature, the method comprises the following steps:
encoding at least one elementary data unit with the determined encoding parameter,
decoding said at least one elementary encoded data unit,
estimating the quality of said at least one elementary data unit by comparing this at least one non-encoded elementary data unit with the one previously decoded.

This quality estimation method is particularly simple to implement.

The invention also concerns a communication apparatus comprising a device as briefly disclosed above, in accordance with the first aspect of the invention.

The invention also relates to:
an information storage means which can be read by a computer or a microprocessor containing code instructions for a computer program for executing the steps of the method according to the first aspect of the invention as for the one briefly disclosed above, and
a partially or totally removable information storage means which can be read by a computer or a microprocessor containing code instructions for a computer program for executing the steps of the method according to the first aspect of the invention as for the one briefly disclosed above.

The invention further relates to a computer program which can be loaded into a programmable apparatus, containing sequences of instructions or portions of software code for implementing steps of the method according to the first aspect of the invention as briefly disclosed above, when said computer program is loaded and executed by the programmable apparatus.

As the features and advantages relating to the device, to the communication apparatus comprising such a device, to the information storage means and to the computer program are the same as those disclosed above concerning the method according to the first aspect of the invention, they will not be repeated here.

According to a second aspect the present invention concerns a method of determining at least one parameter for encoding multimedia digital data organized in elementary units of data intended to be encoded according to at least one encoding mode, characterized in that said method comprises the following steps:
determining the elementary number of operations to be performed in order to decode each elementary data unit encoded according to a different encoding mode,
determining the total number of operations to be performed during a predetermined interval of time in order to decode a plurality of elementary data units encoded as a function on the one hand of the elementary number previously determined and on the other hand the number of elementary units encoded according to each of the encoding modes,
deciding with regard to the determination of at least one data encoding parameter as a function of the total number previously determined and a predetermined total number of operations.

In a complementary manner, the invention relates to a device for determining at least one parameter for encoding multimedia digital data organized in elementary data units intended to be encoded according to at least one encoding mode, characterized in that said device comprises:
means for determining the elementary number of operations to be performed in order to decode each elementary data unit encoded according to a different encoding mode,
means for determining the total number of operations to be performed during a predetermined interval of time in order to decode a plurality of elementary data units encoded as a function on the one hand of the elementary number previously determined and on the other hand the number of elementary units encoded according to each of the encoding modes,
means for deciding with regard to the determination of at least one data encoding parameter as a function of the total number previously determined and a predetermined total number of operations.

In the following description, decoding complexity means the number of operations which it is necessary to perform in order to decode data during a predetermined interval of time (e.g. 1 sec). In a sense this is the minimum computational capacity required for performing the decoding operations.

Thus, by determining the decoding complexity of a plurality of elementary encoded data units, the invention makes it possible to decide on the choice of the encoding parameter or parameters adapted to a predetermined decoding complexity.

Because of this, the encoding parameter or parameters thus determined make it possible to encode the data so that these encoded data give rise, for example, to a decoding complexity less than or equal to the predetermined decoding complexity.

For example, the encoding parameter used for the encoding of data before determining the decoding complexity may prove to be satisfactory or not in the light of the predetermined decoding complexity. If this parameter is not satisfactory, it will then be necessary to determine a parameter which, this time, will be adapted to the predetermined decoding complexity.

It should be noted that, if an encoding parameter is adjusted according to the predetermined decoding complexity, it is because a modification to that parameter has an influence on the decoding complexity for the data encoded with said parameter.

The invention does not require a high storage capacity as in the aforementioned prior art since several versions of data encoded according to different categories of communication apparatus are not stored in advance.

In addition, the processing unit of the device according to the invention is not monopolized by long calculations for a relatively long time, as is the case with the system of the prior art, which has to set up a database of pre-encoded versions.

In the case where the steps of determining the elementary number of operations, of determining the total number of operations during a predetermined interval of time and of deciding are performed in a first communication apparatus connected to a second communication apparatus by a communication network, the invention adapts easily and dynamically to communication apparatus which are not yet connected to the first apparatus, but which can be connected thereto subsequently.

According to one feature, prior to the decision step, the method comprises a step of comparing between the total number of operations determined during the interval of time and the total number of operations which could be performed, during this same interval of time, in the second communication apparatus.

The predetermined decoding complexity thus corresponds to that of the second communication apparatus.

The method according to the invention thus makes it possible to adapt the encoding of the data in the first apparatus to the computational capacity of the second apparatus.

According to another feature, prior to the comparison step, the method comprises a step of obtaining, by the first communication apparatus, the total number of operations which can be performed by the second communication apparatus during the predetermined interval of time.

Thus the information on the computational capacity of the second communication apparatus is transmitted to the first apparatus before the comparison step referred to above.

If one or more communication apparatus are subsequently connected to the first apparatus, it suffices for the information on their respective computational capacities to be transmitted to the first apparatus so that this can adapt the encoding of the data in an appropriate manner.

According to one feature, the method comprises a step of estimating the quality of at least one elementary data unit by comparing said at least one elementary data unit encoded with the determined encoding parameter and said at least one non-encoded elementary data unit.

It is thus possible to produce a version of the elementary data unit adapted to the predetermined decoding complexity and which makes it possible to obtain data, once decoded, of good quality, that is to say faithful to the elementary non-encoded data unit.

It should be noted that, in the case of a transmission of data between first and second communication apparatus, it is thus possible to supply to the second apparatus a version of the elementary data unit of good quality adapted to the computational capacity of the second apparatus.

According to another feature, when several encoding parameters have been determined, the method comprises the following steps:
  estimating the quality of at least one elementary data unit for each determined combination of encoding parameters,
  selecting the best quality among the different qualifies estimated for the different encoding parameters.

It is thus possible to select, by means of another criterion, one combination of encoding parameters among several possible combinations, in each of which one or more encoding parameters have been determined in a fashion adapted to the predetermined decoding complexity.

According to yet another feature, the method comprises the following steps:
  encoding at least one elementary data unit with the determined encoding parameter,
  decoding said at least one elementary encoded data unit,
  estimating the quality of said at least one elementary data unit by comparing this at least one elementary non-encoded data unit with the one previously decoded.

This quality estimation method is particularly simple to implement.

In addition, it is also possible to take a decision with regard to the determination of the encoding parameter or parameters by taking account of characteristics of the communication network such as, for example, the bandwidth available on this network.

The invention also relates to a method of performing a digital transmission by transmitting encoded digital data to a client machine connected through the intermediary of a network, comprising the steps of:
  inputting the digital data;
  detecting the processing capacity of a decoder in the client machine;
  determining an encoding parameter of the digital data in accordance with the result of the detection obtained in said detecting step;
  encoding the digital data in accordance with the encoding parameter determined in said determining step; and
  transmitting the digital data encoded in said encoding step to the client machine.

The invention also concerns a communication apparatus comprising a device as briefly disclosed above in accordance with the second aspect of the invention.

The invention also relates to:
  an information storage means which can be read by a computer or a microprocessor containing code instructions for a computer program for executing the steps of the method according to the second aspect of the invention as for the one briefly disclosed above, and
  a partially or totally removable information storage means which can be read by a computer or a microprocessor containing code instructions for a computer program for executing the steps of the method according to the second aspect of the invention as for the one briefly disclosed above.

The invention further relates to a computer program which can be loaded into a programmable apparatus, containing sequences of instructions or portions of software code for implementing steps of the method according to the second aspect of the invention as briefly disclosed above, when said computer program is loaded and executed by the programmable apparatus.

As the features and advantages relating to the device, to the communication apparatus comprising such a device, to the information storage means and to the computer program are the same as those disclosed above concerning the method according to the second aspect of the invention, they will not be repeated here.

Other features and advantages of the present invention will emerge more clearly from a reading of the following description, given with reference to the accompanying drawings, in which:

FIG. 4c shows a variant embodiment of the algorithm of FIG. 4a;

FIG. 1 shows a communication architecture of the client-server type in which the invention is advantageously implemented.

Figure 1:
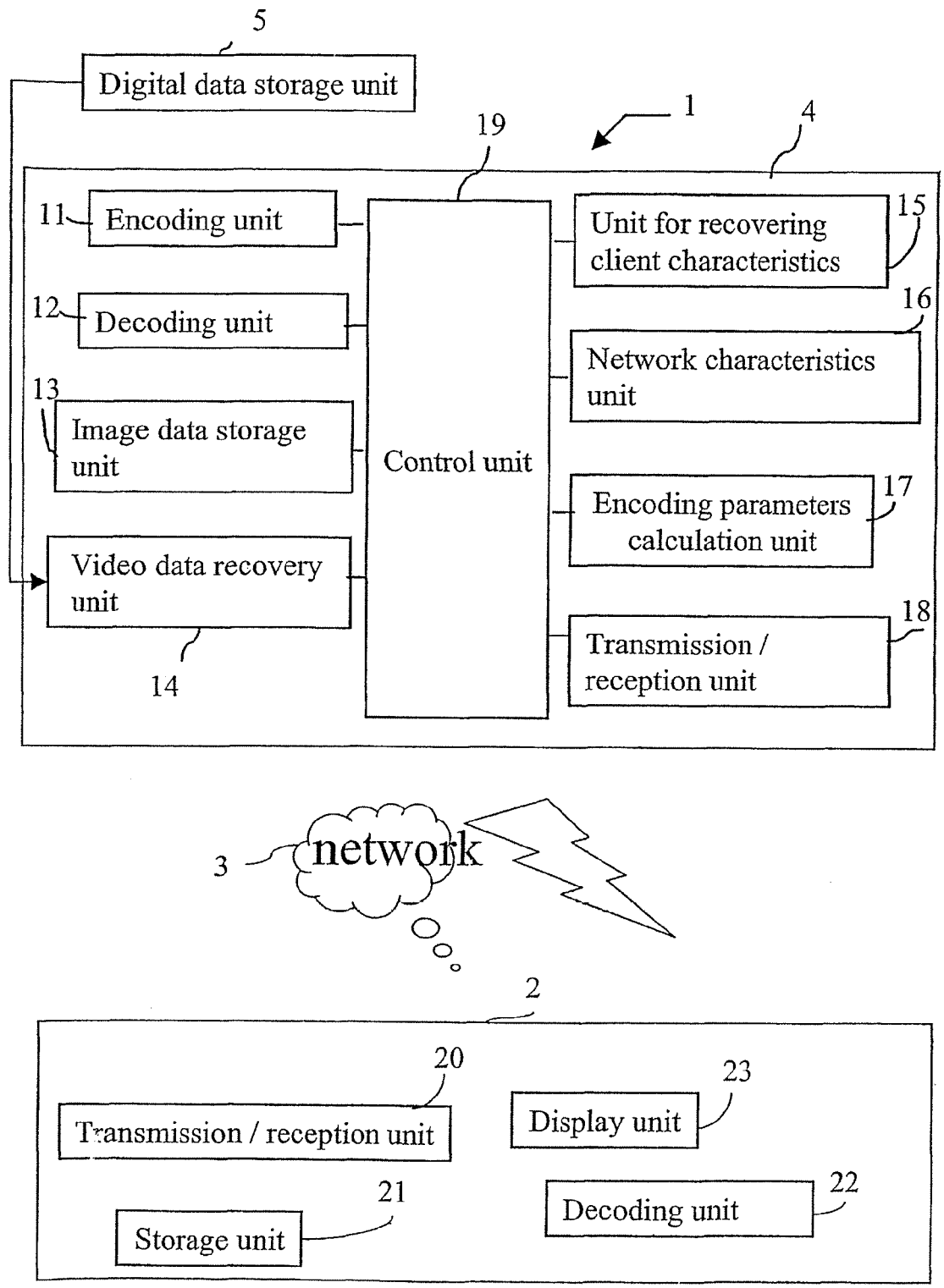
FIG. 1 shows schematically a communication architecture of the client-server type in which the invention can be implemented.

In this figure, a first communication apparatus 1 fulfilling the role of the server is connected to a second communication apparatus 2, which is the client machine, by means of a communication network 3 and a connection which is considered as being established.

This network is for example a wireless local area communication network within a dwelling.

More particularly, this network is in accordance with the standard IEEE802.11.

The example considered concerns a point to point transmission of data between the server 1 and the client machine 2.

However, the principle remains applicable to the case where the server is connected simultaneously to several client machines which may require multimedia digital data from the server.

It is however necessary, in this case, to take into account, on the one hand, the management of the processes of adaptation and transmission in parallel with the different adapted versions of the data requested and on the other hand the multiple accesses to the memory or memories of the server.

It should be noted that the data stored in the server can have been received from the environment external to the dwelling, for example through another communication network such as the internet.

The data grouped together under the term multimedia data may, in non-limiting manner, be fixed images, videos, sound, data of the text type (e.g. graphical documents etc), documents in HTML language, signals issuing from a facsimile machine or printer etc.

In the example embodiment under consideration, only video data will be considered and these will be transmitted without loss over the network 3.

The device according to the invention makes it possible to adapt, in general terms, the content of the data requested by a client machine to at least one of the characteristics of this machine and, more particularly, to the available memory capacity and/or the computational capacity thereof.

The available memory capacity and/or the computational capacity of a machine and/or, more specifically, the processing capacity of a decoder are predetermined magnitudes which are representative of the resources which are available in the machine for decoding encoded data.

The memory capacity of a machine corresponds to the memory space available in that machine for the storage of data.

In the context of the invention, this is more particularly the memory space available for the storage of data at the time of the decoding operations of these data.

Computational capacity of the client machine means the number of operations which this machine can perform in a predetermined interval of time corresponding for example to 1 second.

The device 4 according to the invention is for example integrated into the server 1 in FIG. 1 and can comprise electronic elements and/or software elements.

However, the device according to the invention could, for example, be merged with the server 1.

The device 4 comprises units 11 and 12, which make it possible respectively to encode and decode a video.

The server comprises a unit 5 for storing digital data such as videos.

The algorithms of the encoding and decoding methods will be described respectively with reference to FIGS. 3a and 3b.

It should be noted that the videos are created, for example, by a digital camcorder or any other data acquisition means or are transmitted by an external communication network and are stored in the unit 5, which can be included or not in the device 4.

This unit can for example be a local or distributed database.

In addition, the videos are stored either in non-compressed form, for example according to a YUV format, according to a preferred embodiment of the invention, or in compressed form, using the encoding method implemented in the encoding unit 11.

It should be noted that a video format of the YUV type means that the video concerned has three components, the component Y for luminance and the components U and V for chrominance.

The device 4 also comprises a storage unit 13 intended to temporarily store digital data and encoded videos, and a unit 14 for recovering data characteristic of the videos from the storage unit 5.

The data recovered by the unit 14 are either the values associated with each of the pixels of each image of a video or the information peculiar to this video, namely the size of the video file, the path for accessing this video and, where the video is stored in compressed form, the encoding parameters which were used for encoding this video.

The device 4 also comprises a unit 15 for retrieving the characteristics of the client machine 2, namely the memory capacity and/or the computational capacity and the resolution of its display screen.

It should be noted that these characteristics can be obtained following the transmission of a specific request by the device 4.

The device 4 also comprises a unit 16 for retrieving the characteristics of the network 3, a unit 17 for determining the encoding parameters, and a unit 18 for transmitting/receiving digital data.

The unit 17 implements the method of determining the encoding parameters which will be described subsequently with reference to FIGS. 4a to 4c.

The unit 18 for its part carries out the transmission of data to the client machine 2 through the network 3, as well as the reception of data coming from the client machine.

The device 4 according to the invention also comprises a unit 19 for controlling the different operations performed.

It should be noted that the different units which make up the device according to the invention, and more generally the server, are resident on the same machine.

However, it can be envisaged distributing these units over several server machines and establishing communications between these different units through the communication network 3.

Since this distribution of the units in no way modifies the implementation of the invention, it will be considered hereinafter, for reasons of simplicity, that all the units are located on the same machine, which will be referred to as the server.

The client machine 2 comprises a digital data transmission/reception unit 20.

This unit 20 carries out the transmission of data to the device 4, through the network 3, and the reception of data coming from the device.

The client machine 2 also comprises a digital data storage unit 21, a decoding unit 22 identical to the unit 12 of the device 4 and a display unit 23, for displaying decoded videos.

Figure 2:
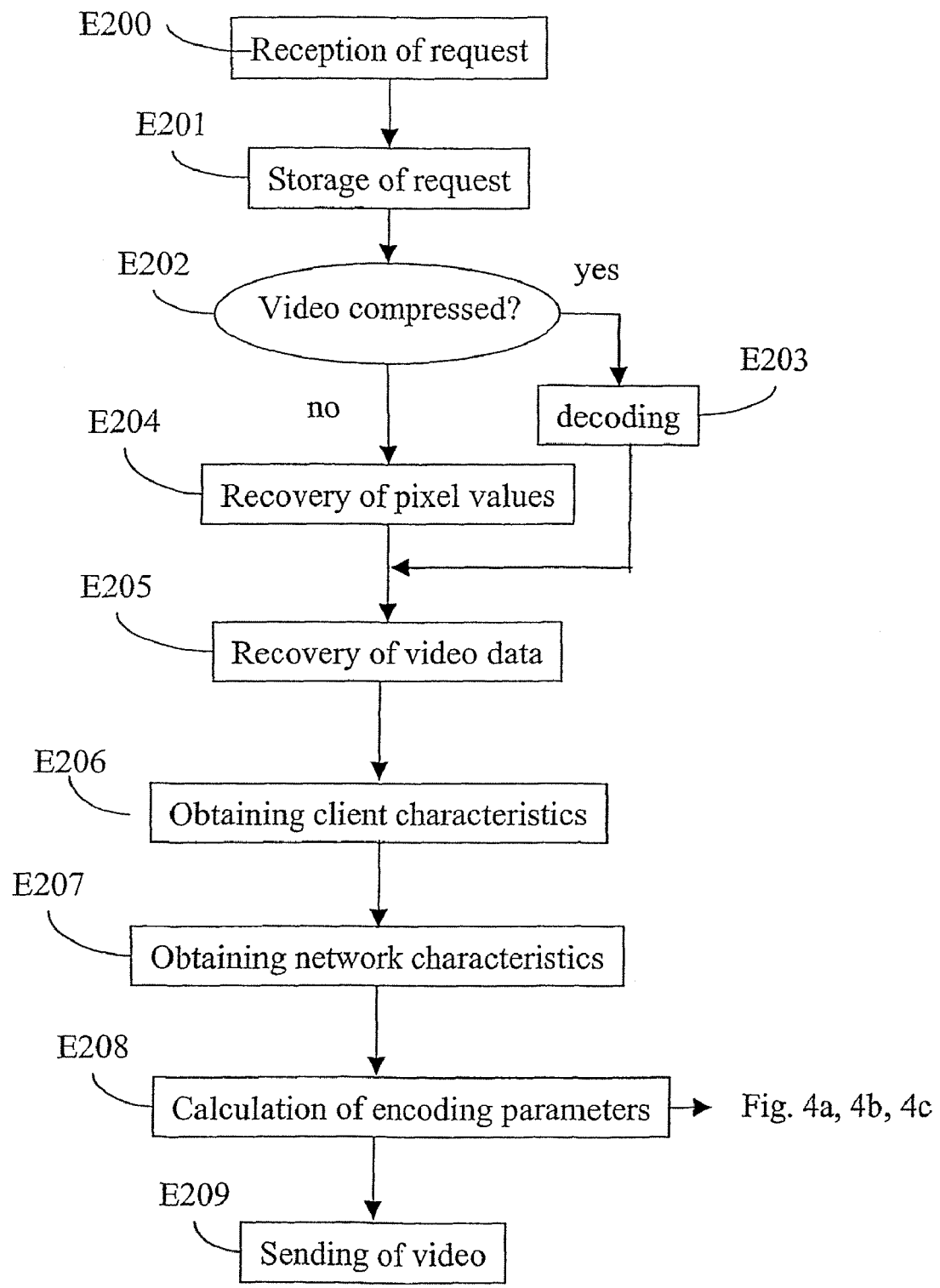
FIG. 2 shows a video data processing algorithm according to the invention.

FIG. 2 illustrates an algorithm comprising different instructions or portions of software code corresponding to steps of the method according to the invention.

The computer program denoted "Progr" which is based on this algorithm is stored in the temporary data storage unit 13 of FIG. 1 and executed by the unit 17 under the control of the control unit 19, which thus makes it possible to implement the method according to the invention.

Figure 5:
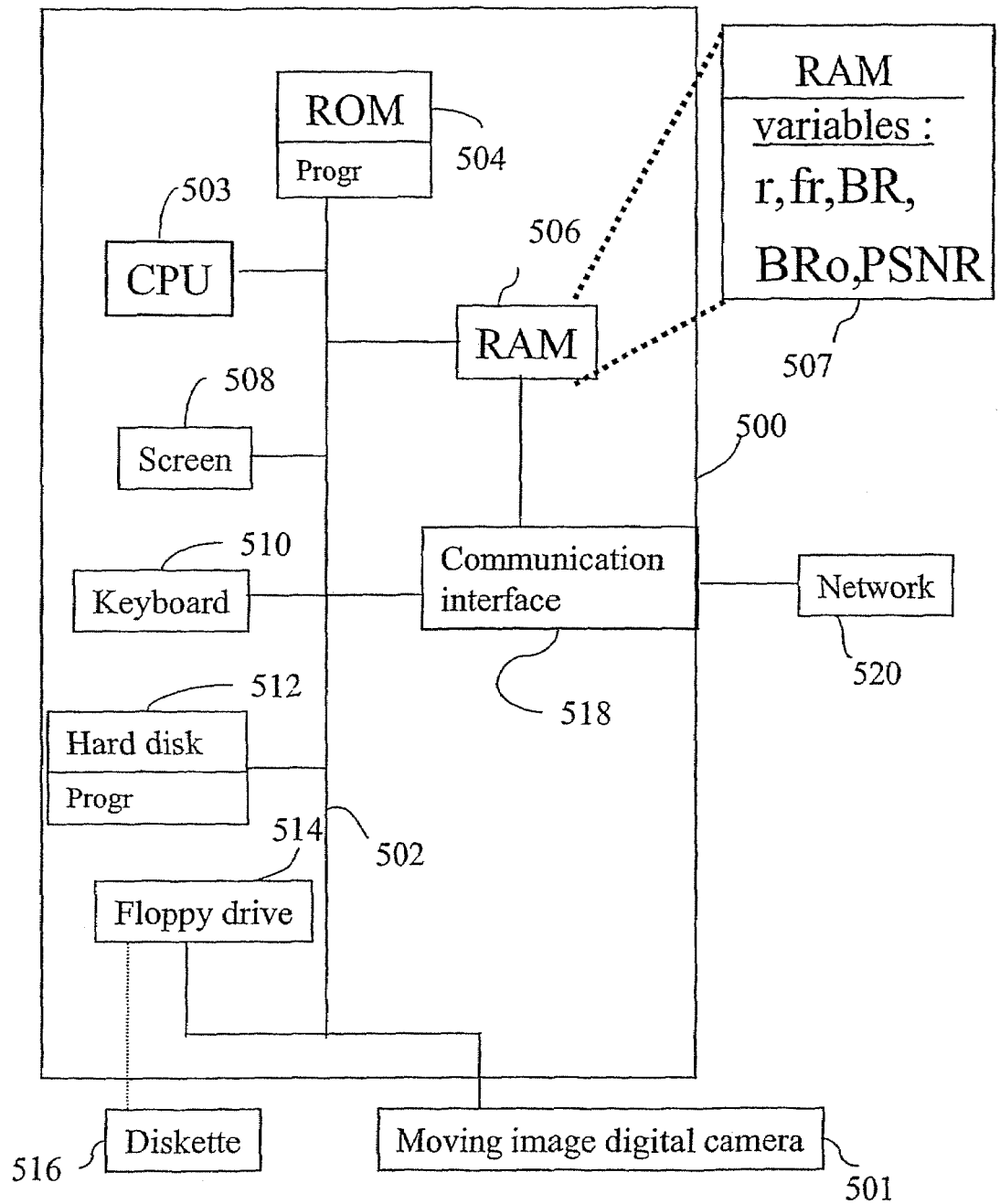
FIG. 5 is an embodiment of a programmable apparatus implementing the invention.

This program is also stored in the apparatus of FIG. 5.

The algorithm of FIG. 2 comprises a first step denoted E200, during which the device 4 of FIG. 1 and, more particularly, the reception unit 18 receives a request sent by the client machine 2 from the transmission unit 20.

For example, this request is in the form of a string of characters making it possible to uniquely identify video data stored in the storage unit 5 of the server 1.

During the following step E201, the request coming from the client machine 2 is transferred to the temporary storage unit 13 for the purpose of storage.

Step E201 is followed by a step E202, during which a test is performed to determine whether the video data stored in the storage unit 5 and forming the subject of the request from the client machine are available in compressed form.

In the affirmative, step E202 is followed by a step E203 during which the decoding unit 12 of the device of FIG. 1 decodes the video data according to the encoding parameters supplied, for example, by the header of the bit stream stored in the storage unit 5.

Once the decoding of the video data has taken place, the decoded data presented in YUV format and the aforementioned encoding parameters are stored in the storage unit 13.

Returning to step E202, when the test performed during this step is negative, step E204 makes provision for retrieving the values of the pixels available in the storage unit 5 and storing them in the storage unit 13.

Steps E203 and E204 which have Just been described are both followed by a step E205, during which the unit 14 carries out a recovery of the video data.

It is a case here of obtaining characteristics of these video data, namely the encoding parameter or parameters used if these video data were present in the storage unit 5 in compressed form.

Thus the encoding parameters can for example be the spatial resolution of the video, the number of images per second of this video (temporal resolution), the number of images encoded in Intra mode or in Inter mode etc.

In the case where the video data were not available in compressed form in the storage unit 5, the information associated with the video data and which is recovered at step E205 is, for example, the information according to which the video was not compressed and its resolution.

During the following step E206, the characteristics of the client machine 2 which sent the request mentioned at step E200 are obtained.

The characteristics of the client machine are for example retrieved following on from the transmission of a request to obtain these characteristics, from the device 4 of FIG. 1 to the client machine 2, through the communication network 3.

These characteristics are principally the memory capacity available in the client machine 2 and/or the total number of operations which it can perform (computational capacity of the client machine) and the resolution of its display unit 23 (screen).

These characteristics are stored in a temporary fashion in the storage unit 13 of the device 4 in FIG. 1.

Preferentially, the computational capacity of the client machine is equal to the speed of the processor thereof, expressed as a number of elementary operations per second.

Step E206 is followed by a step E207 during which the device 4 of FIG. 1 obtains the characteristics of the communication network 3, such as the bandwidth available for transmitting the video data from the device 4 to the client machine 2, the packet loss, the bit error rate etc.

Preferentially, the characteristics of the network taken into account will be limited to the available bandwidth.

These characteristics are retrieved by the unit 16, which then stores them in the temporary storage unit 13.

During the following step E208, the encoding parameter or parameters of the video data are determined in a manner adapted to the memory capacity of the client machine 2.

The details of the operations performed during this step will be provided subsequently during the description given with reference to FIGS. 4a and 4b.

In addition, by way of variant, during this step E208, determination of the encoding parameter or parameters of the data may also be carried out in a manner adapted to the memory capacity as well as to the computational capacity of the client machine.

This variant will be described later with reference to FIG. 4c.

This step is performed by the unit 17 of the device 4 of FIG. 1 under the control of the control unit 19 and using the information available in the storage unit 13.

This encoding parameter or parameters can also be determined in a manner adapted to the characteristics of the communication network 3, in addition to the memory capacity of the client machine and/or to its computational capacity.

During the following step E209, the device 4 of FIG. 1 and, more particularly, the transmission unit 18 thereof transmits the video data which were previously compressed at step E208 to the client machine 2.

It should be noted that the transmission of the compressed video data preferably takes place "on the fly", the process being known as "streaming", that is to say the information necessary to the user for reconstructing an image is stored in the storage unit 13 and then transmitted to the client machine 2 before all the video data are compressed.

Thus the user receives the information at the client machine 2 in packets, in each of which there is information enabling this user to decode a current image.

Figure 3A:
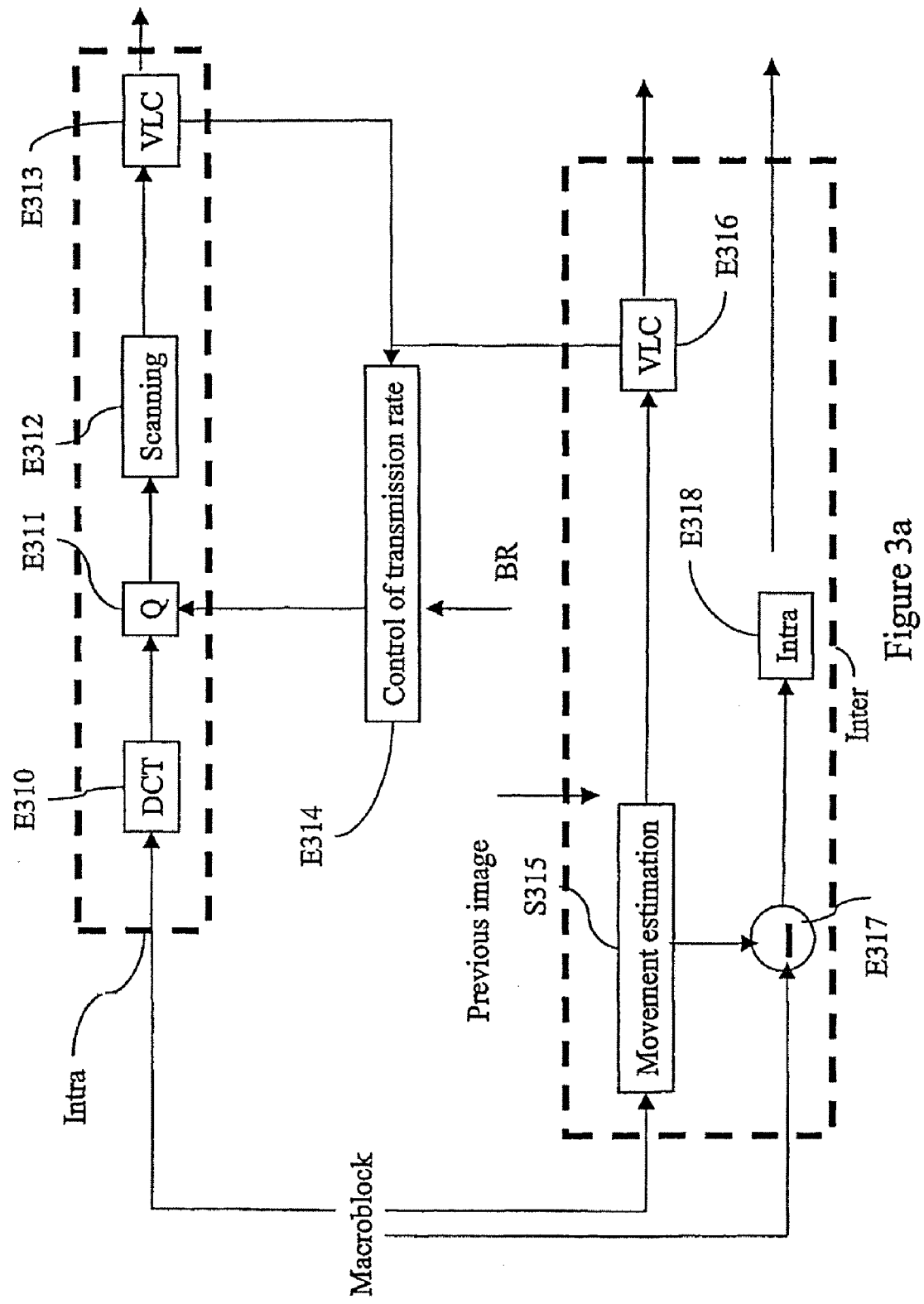
FIG. 3a shows a video data encoding algorithm.
Figure 3B:
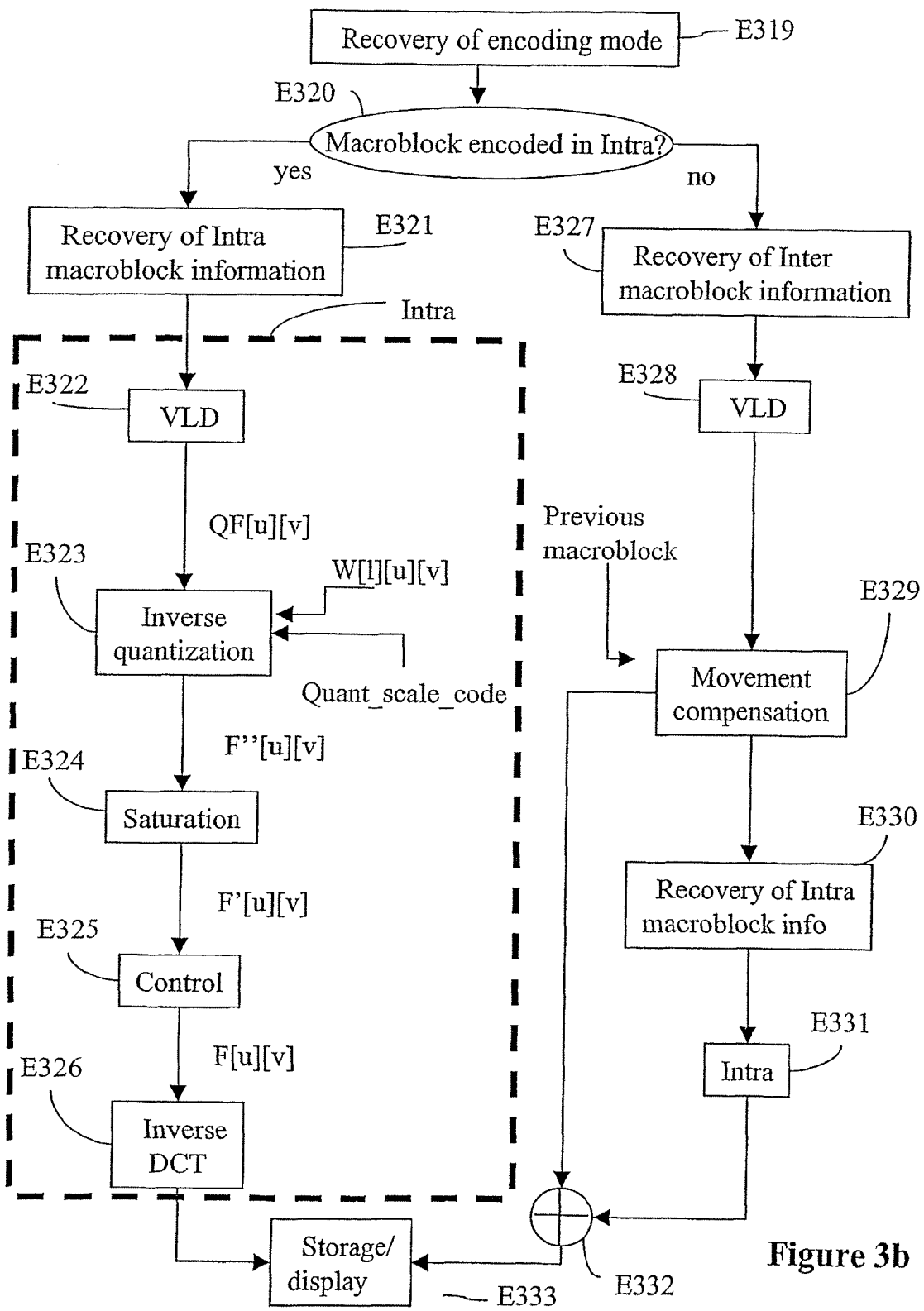
FIG. 3b shows a video data decoding algorithm.

FIGS. 3a and 3b illustrate respectively the encoding and decoding of a color video in YUV format.

According to a preferred embodiment of the invention, the video decoder used for implementing this invention is in accordance with the visual part of the standard MPEG-4 (Information Technology—Generic Coding of Audio-Visual Objects=Part 2: Visual, ISO/IEC JTC1/SC 29/WG11 N 3056, December 2000).

In the example dealt with here, the video will be considered to be a single object of rectangular shape.

Consequently only a restricted set of compression tools which allow the texture decoding and movement compensation will be taken into account. The tools necessary for the decoding of the arbitrary form of an object are therefore not used here.

It should be noted that the texture of an image is given by the values of the pixels of the image which are expressed in three components.

The videos are stored on the server 1 either in compressed form in mp4 format in accordance with the MPEG-4 standard, or in non-compressed form in YUV format.

Use is made for example of the YUV format of the type 4:2:0, which means that the chrominance components (U, V) have four time fewer samples (pixels) than the luminance components (Y).

FIG. 3a illustrates the encoding method used by the encoding unit 11 of FIG. 1.

Each image of the video requested by the user is divided into blocks of data of 8×8 pixels.

Each group of four blocks forms a macroblock of 16×16 pixels.

The encoding of an image is carried out on each of the macroblocks according to two distinct encoding modes: one denoted I for the intra encoding mode and the other denoted P for the predictive or Inter encoding mode.

A sequence of images of 1 second will be encoded in the following manner IPPIPPIPPIPPIPPIPPIPPIPPIPPIPP . . . .

This means that the first image is encoded according to the intra mode, the following two according to the Inter mode, the following according to the intra mode, the following two according to the Inter mode, etc.

Thus, for a sequence of 30 images per second, 10 images will be encoded in Intra mode and 20 images in Inter mode.

It should be noted that a sequence of images will hereinafter be referred to as a segment.

In Intra mode, the encoding takes place block by block in accordance with steps E310 to E313 in FIG. 3a.

In this encoding mode, each block constitutes an elementary data unit which is encoded independently of the other blocks.

It should be stated that the values of the pixels of each image of the segment of images to be encoded are stored temporarily in the temporary storage unit 13 in FIG. 1 and constitute a video which is referred to as the original video.

Where the video is stored in the storage unit 5 in compressed form, the decoding method is applied at step E203 of FIG. 2 so as to obtain a video in YUV format.

The values of the video thus reconstructed are stored in the temporary storage unit 13 and in the storage unit 5, also referred to as the original video.

The method of encoding a block in Intra mode begins with a step E310 during which the discrete cosine transform is calculated according to the known method described in the article entitled "*Fast Algorithms for the Discrete Cosine Transform*", E. Feig and S. Winograd, *IEEE Trans. On Signal Proc.*, vol. 40, No. 9, September 1992.

Step E310 is followed by a step E311, which makes provision for quantizing the transformed coefficients obtained during step E310.

Step E311 is followed by a step E312 during which the quantized coefficients are ordered so that the variable-length encoding method used during the subsequent step E313 is as effective as possible.

For this purpose, the scanning method described in the standard *Information Technology—Generic Coding of Audio-Visual Objects=Part 2: Visual, ISO/IEC JTC 1/SC 29/WG*11 *N*3056, December 2000 is used.

Step E312 is followed by a step E313 according to which the statistical encoding of the ordered coefficients is carried out according to the variable-length encoding method described in the standard *Information Technology—Generic Coding of Audio-Visual Objects=Part 2: Visual, ISO/IEC JTC 1/SC 29/WG*11 *N*3056, December 2000.

At the end of step E313, the statistically encoded coefficients are stored in the temporary storage unit 13 and are concatenated with the other encoding information of the current image.

In predictive or Inter mode, the encoding is carried out macroblock by macroblock, where each macroblock constitutes an elementary data unit which is encoded independently of the others.

Each of the macroblocks can be encoded either in Intra mode or in Inter mode.

The encoding mode is chosen according to the activity present inside a macroblock.

For example, this activity is measured by the variance between a macroblock of a current image and the macroblock of the previous image situated at the same spatial position.

If the variance is greater than a predetermined threshold, then the macroblock is encoded in Inter mode.

This macroblock will be encoded in Intra mode in the contrary case.

If the macroblock is encoded in Intra mode, then the encoding is carried out according to steps E310 to E313 described previously.

If the macroblock is encoded in Inter mode, the encoding is carried out according to steps E315 to E317, which will be explained below.

During step E315, a conventional method of movement estimation by comparison of macroblocks is applied.

The algorithms used are based on the simplifying hypothesis according to which the pixels of the same macroblock have the same movement imparted to them.

The movement vector of a macroblock of a current image is then determined by finding the macroblock with the greatest resemblance in the previous image in a preselected search window.

If the dimensions of the search window exert an Influence on the time for calculating the movement estimation, the major problem related to the movement estimation which is carried out by comparing macroblocks remains the determination of the distance between the macroblocks.

Use will preferably be made of a movement estimation method described in the article "*In-line Movement Estimation*", by L. Difdier, R. Kamdem, LIM University of Provence, December '96.

This method makes it possible to obtain a movement vector with two translation movement components.

In order to obtain a bit stream in accordance with MPEG-4, this movement vector is encoded differentially with respect to the movement vector of the macroblock of the previous image disposed at the same spatial position.

Step E315 is followed by a step E316 during which the previously determined differential movement vector is statistically encoded.

The coefficients thus obtained are stored in the temporary storage unit 13 and are concatenated with the other encoding information of the current image.

Once the movement for a macroblock has been estimated during the execution of step E315, then, in accordance with step E317, a so-called predicted macroblock is constructed from the macroblock of the previous image to which the movement vector associated with this macroblock is applied.

Next, a so-called difference macroblock is calculated between the macroblock of the current image and the predicted macroblock.

Step E317 is followed by a step E318 during which the difference macroblock is encoded according to the Intra mode described above.

The coefficients resulting from the Intra encoding mode are stored in the temporary storage unit 13 and are concatenated with the other encoding information of the macroblock of the current image.

The parameters used during the quantization and variable-length encoding steps are defined for each macroblock, whether in Intra mode or Inter mode.

For this purpose, a conventional transmission rate control method is used during a step E314.

This method makes it possible to control the allocation of rate for each macroblock so as to not to exceed the total rate allocated to the transmission of the compressed video.

In the example described, the maximum transmission rate value is fixed by the value BR.

The data encoded and stored in a temporary fashion in the unit 13 are put in the MPEG-4 format, as indicated in the standard *Information Technology—Generic Coding of Audio-Visual Objects=Part 2: Visual, ISO/IEC JTC 1/SC 29/WG11 N3056, December 2000*, before being transmitted over the network 3 in FIG. 1 to the client machine 2.

It should be noted that the encoding mode used for encoding each macroblock forms part of the information transmitted.

FIG. 3b illustrates the decoding method used by the decoding unit 12 of the device 4 and by the decoding unit 22 of the client machine 2 in FIG. 1.

The decoding method will be described when it is used in the client machine 2 and, more particularly, at the units 20, 21 and 22.

The transposition of this description to the decoding method used by the device 4 of the server 1 is carried out easily by replacing the units 20, 21 and 22 respectively with the units 18, 13 and 12.

The client machine 2 has a storage unit 21 supplied with the digital data coming from the device 4 by means of the connection established between the two machines through the network 3.

These data are received by the reception unit 20 in the form of packets which contain the information necessary for decoding one or more macroblocks of the current image.

The storage unit 21 is capable of extracting information from the bitstream generated by the encoding unit 11 of the device 4 and supplying it to the decoding unit 22 of the client machine 2.

FIG. 3b illustrates the decoding of a macroblock encoded either in Intra mode, as indicated by steps 322 to 326, or in Inter or predictive mode as indicated by steps 327 to 332.

The decoding algorithm begins with a step E319 during which the encoding mode of the current macroblock is recovered.

During step E320, a test is carried out to determine whether the macroblock was encoded in Intra mode.

If so, step E320 is followed by a step E321, which makes provision for recovering, from the storage unit 21, the statistical coefficients (variable-length codes) related to this macroblock.

Step E321 is followed by a step E322, which performs the decoding of these coefficients in accordance with the table of coefficients described in the standard *Information Technology—Generic Coding of Audio-Visual Objects=Part 2: Visual, ISO/IEC JTC 1/SC 29/WG11 N3056, December 2000*.

The coefficients thus obtained form a set of bi-dimensional data denoted QF[u][v].

During the following step E323, an inverse quantization operation is performed on the values of the set of data QF[u][v] in order to obtain the bi-dimensional table F"[u][v] according to the quantization tables described in the standard *Information Technology—Generic Coding of Audio-Visual Objects=Part 2: Visual, ISO/IEC JTC 1/SC 29/WG11 N3056, December 2000*.

During the following step E324, a saturation method is applied to the values of the coefficients in the bi-dimensional table F"[u][v] according to the standard *Information Technology—Generic Coding of Audio-Visual Objects=Part 2: Visual, ISO/IEC JTC 1/SC 29/WG11 N3056, December 2000*, so as to obtain the bi-dimensional table F'[u][v] whose values belong to the interval $[-2^{bits\ per\ pixel+3}, 2^{bit\ per\ pixel}+3-1]$.

The number of bits per pixel is preferably 8.

During the following step E325, an operation of controlling the saturated coefficients is performed so as to obtain the DCT coefficients F[u][v].

During the following step E326, the values of the pixels of the current macroblock are reconstructed as a function of the DCT coefficients F[u][v] using the decoding method described in the article "*Fast Algorithms for the Discrete Cosine Transform*" E. Feig and S. Winograd, *IEEE Trans. On Signal Proc.*, vol. 40, No. 9, September 1992.

These reconstructed values are stored in the storage unit 21 with a view to being displayed on the display unit 23.

The algorithm for decoding a macroblock is given below.

The values of the coefficients dc_scaler, quantizer scale and of the matrix W[l][u][v] used in this algorithm are values defined by the standard *Information Technology—Generic Coding of Audio-Visual Objects=Part 2: Visual, ISO/IEC JTC 1/SC 29/WG11 N3056, December 2000*.

```
for (v=0; v<8;v++) {
    for (u=0; u<8;u++) {
        if (QF[u][v] == 0)
            F"[u][v] = 0;
        else if ( (u==0) && (v==0) && (macroblock_intra) ) {
            F"[u][v] = dc_scaler * QF[u][v];
        } else {
            if ( macroblock_intra ) {
                F"[u][v] = ( QF[u][v] * W[0][u][v] *
                    quantiser_scale ) / 32;
            } else {
                F"[u][v] = ( ( ( QF[u][v] * 2) + Sign(QF[u][v]) ) *
                    W[1][u][v] * quantiser_scale ) / 32;
            }
        }
    }
}
sum = 0;
for (v=0; v<8;v++) {
    for (u=0; u<8;u++) {
        if ( F"[u][v] > 2 bits_per_pixel + 3 – 1 ) {
            F'[u][v] = 2 bits_per_pixel + 3 – 1;
        } else {
            if ( F"[u][v] < –2 bits_per_pixel + 3 ) {
                F'[u][v] = –2 bits_per_pixel + 3 ;
            } else {
                F'[u][v] = F"[u][v];
            }
        }
        sum = sum + F'[u][v];
        F[u][v] = F'[u][v];
    }
}
if ((sum & 1) == 0) {
    if ((F[7][7] & 1) != 0) {
        F[7][7] = F'[7][7] – 1;
    } else {
        F[7][7] = F'[7][7] + 1;
    }
}
```

The method for the discrete cosine transformation of a pixel f(x,y) of a block of size N×N is given by the following equation:

$$F(u, v) = \frac{2}{N} C(u)C(v) \sum_{x=0}^{N-1} \sum_{y=0}^{N-1} f(x, y) \cos\frac{(2x+1)u\pi}{2N} \cos\frac{(2y+1)v\pi}{2N}$$

with $u, v = 0, 1, 2, \ldots N-1$, where x, y are the spatial coordinates, u, v are the coordinates in the transformed domain, and $$C(u), C(v) = \begin{cases} \frac{1}{\sqrt{2}} & \text{for } u, v = 0 \\ 1 & \text{otherwise} \end{cases}$$

Each pixel is represented by n bits (in order to represent one of the components Y, U or V) and the transformed coefficients are represented by (n+4) bits. The amplitude of the DCT coefficients is in the interval $[-2^{n+3}; +2^{n+3}-1]$.

Use is preferably made of a fast DCT encoding/decoding method.

This method, described in the article "Fast Algorithms for the Discrete Cosine Transform", E. Feig and S. Winograd, IEEE Trans. On Signal Proc., vol. 40, No. 9, September 1992, makes it possible to encode/decode macroblocks of size $2^m$ (here m=3) according to the following equation:

$$Y = C_8 * Y$$

where Y is the vector of the DCT coefficients of dimension 8 and $C_8$ the 8*8 matrix of DCT coefficients.

This matrix can be factorized and, after a few algebraic manipulations, this matrix is equal to $C_8 = P_8 * K_8 * B_8$, where $P_8$ is a matrix of permutation of the signs of dimension 8*8, $K_8$ and $B_8$ are matrices of coefficients of dimension 8*8 which have been defined so as to obtain a fast encoder/decoder.

Following on from step E326, step E333 provides for a storage and display of the decoded macroblocks using the units 21 and 23. The current image is reconstructed once all the macroblocks of this image have been decoded and displayed.

Returning to step E320, if the result of the test is negative, this means that the macroblock was encoded in Inter or predictive mode.

During the following step E327, Information is then recovered from among the digital data transmitted by the device 4 and stored in the storage unit 21 of the client machine 2.

This information is peculiar to the encoding of the macroblock in Inter mode and is for example the statistical coefficients (variable-length codes) related to this macroblock.

Step E327 is followed by a step E328, which makes provision for decoding these statistical coefficients so as to obtain the differential movement vector.

During the following step E329, the movement vector is reconstructed from the differential movement vector and the movement vector (Px,Py) of the macroblock of the previous image disposed at the same spatial position.

The algorithm used is as follows:

```
r_size = vop_fcode - 1
f = 1 << r_size
high = ( 32 * f ) - 1;
low = ( (-32) * f);
```

-continued

```
range = ( 64 * f);
if ( ( f == 1 ) || (horizontal_mv_data == 0) )
    MVDx = horizontal_mv_data;
else {
    MVDx = ( ( Abs(horizontal_mv_data) - 1 ) * f ) +
    horizontal_mv_residual + 1;
        if (horizontal_mv_data < 0)
            MVDx = - MVDx;
}
if ( ( f == 1 ) || (vertical_mv_data == 0) )
    MVDy = vertical_mv_data;
else {
    MVDy = ( ( Abs(vertical_mv_data) - 1 ) * f ) +
    vertical_mv_residual + 1;
        if (vertical_mv_data < 0)
            MVDy = - MVDy;
}
MVx = Px + MVDx;
if ( MVx < low )
    MVx = MVx + range;
if (MVx > high)
    MVx = MVx - range;
MVy = Py + MVDy;
if ( MVy < low )
    MVy = MVy + range;
if (MVy > high)
    MVy = MVy - range;
```

The parameters of the bit stream are such that the components MVDx and MVDy of the differential movement vector belong to the interval [low; high].

The extreme values of this interval are chosen when the decoder is implemented.

Moreover, the components of the reconstructed movement vector, MVx and MVy, also belong to this interval. The values which define this interval for the movement vectors are defined by the standard *Information Technology—Genetic Coding of Audio-Visual Objects=Part* 2: Visual, ISO/IEC JTC 1/SC 29/WG11 N3056, December 2000.

It should be noted that r_size, f, MVDX, MVDy, high, low and range are variables, whereas the data horizontal_mv_data, vertical_mv_data, horizontal_mv_residual and vertical_mv_residual are extracted from the bit stream.

The variable vop_fcode refers to the prediction mode used which is extracted from the bit stream.

During this same step E329, the macroblock of the previous image is compensated for movement, that is to say the macroblock is moved by the movement vector which has Just been reconstructed.

During the following step E330, the information peculiar to the encoding of the macroblock in Intra mode is recovered and, in particular, the statistical coefficients which represent the difference macroblock.

During the following step E331, the difference macroblock is reconstructed from these statistical coefficients according to the Intra decoding method described previously, during the execution of steps E322 to E326.

Step E331 is followed by a step E332 which calculates the sum of the compensated macroblock of step E329 and the difference macroblock obtained at step E331.

Step E332 is followed by a step E333 which organizes the storage of the decoded macroblocks in the unit 21.

The image is then displayed on the display unit 23 once all the macroblocks have been decoded.

Figure 4A:
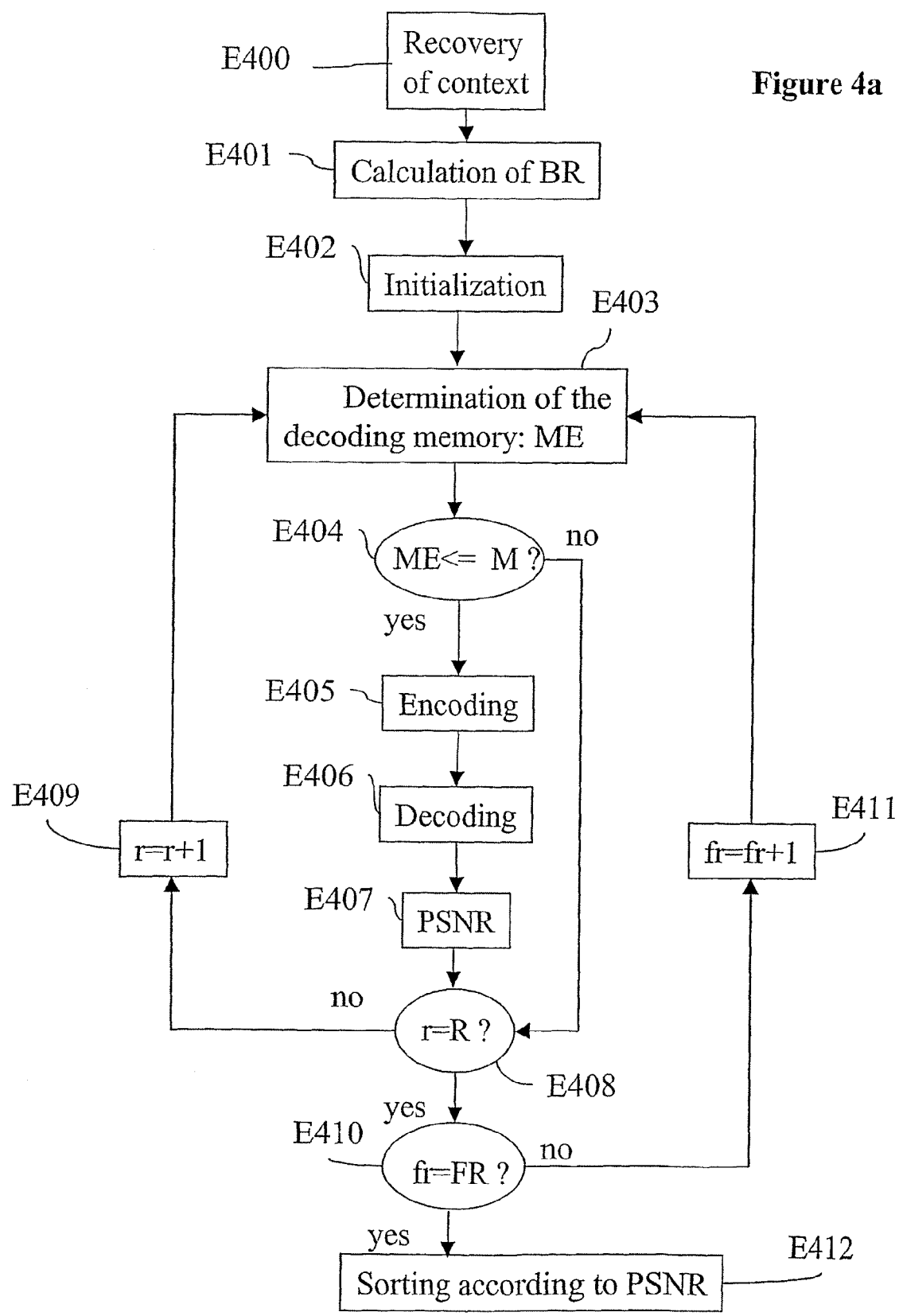
FIG. 4a shows an algorithm for determining at least one video data encoding parameter according to the first aspect of the invention and which corresponds to step E208 of the algorithm in FIG. 2.

FIG. 4a illustrates the algorithm detailing the different operations performed during step E208 of FIG. 2.

More particularly, this algorithm contains different instructions or portions of software code corresponding to steps of the data encoding parameter determination method according to the first aspect of the invention.

The computer program which is based on this algorithm is stored in the temporary data storage unit 13 of FIG. 1 and executed by the unit 17 under the control of the control unit.

This program forms part of the program "Progr" mentioned above with reference to FIG. 2 and is also stored in the apparatus of FIG. 5.

The execution of the computer program based on this algorithm will implement the method for adapting one or more encoding parameters which will be used for encoding the data transmitted to the client machine, according to the memory capacity of the latter (predetermined magnitude).

Moreover, this method can also make it possible to adapt this encoding parameter or parameters to the resolution of the screen of the client machine 2 and to the resources available on the communication network 3, namely the bandwidth.

The algorithm of FIG. 4a begins with a step E400 during which the context is retrieved in which the data will be transmitted from the device 4 of the server 1 to the client machine 2 (FIG. 1).

More particularly, the retrieval of this context consists of obtaining, from the temporary storage unit 13:
 the total memory capacity M available in the client machine 2,
 the resolution of the screen of this machine,
 the bandwidth BP available on the communication network 3 for transmitting the video data, and
 the encoding parameter or parameters used for encoding the video data stored in the storage unit 5.

The encoding parameters used are for example the size of the file containing the video data, denoted BRo, the resolution of the image ro and the number of images per second fro.

It should be noted that, when the video data are stored in the YUV format, the encoding parameters such as the size of the file, the resolution of the image and the number of images per second are necessarily retrieved during this step E400.

The other encoding parameters used for encoding these video data are then values which are chosen by default.

During the following step E401, the size of the video file BR which will be transmitted is determined.

During this step, two cases are envisaged depending on whether the size of the file BRo stored in the storage unit 5 of FIG. 1 is greater or lesser than the bandwidth available on the communication network 3.

For this purpose, account is taken of the value of the maximum rate BR allowed in the communication network 3 and which is allocated to the transmission rate control module during the execution of step E314 in FIG. 3a.

The size of the video file BR which it is possible to transmit is then supplied by the following equation:

$$BR=\min(BRo,BP).$$

During the following step E402, the values contained in two tables are initialized: a first table, of size R, in which there are stored the acceptable resolution values of an image, and a second table, of size FR, in which there are stored different values of the number of images per second.

More particularly, the resolution values of the image which are contained in the first table are acceptable in so far as these resolution values are less than or equal to the resolution of the display unit 23 of the client machine 2 (FIG. 1) and which is stored in the storage unit 21.

A first table will for example be chosen whose first value is equal to the resolution of the video data stored in the storage unit 5 of FIG. 1 and constituting the original version of the video mentioned above, in the case, of course, where this value is considered to be acceptable.

The other acceptable values appearing in this table are selected first and, in the case where the dimension of the table is three, the last two values correspond to a resolution of 352 columns and 288 rows, in one case, and 176 columns and 144 rows in the other.

The second table containing different values of the number of images per second is for example also of dimension three and the first value of this table is equal to the number of images per second of the original version of the video stored in the storage unit 5 of FIG. 1.

The other two values are respectively equal to 20 and 10 images per second.

More particularly, during this step, two index variables, fr and r, corresponding respectively to the second and first table mentioned above, are initialized.

Each index variable is initialized to the first value contained in the corresponding table.

During the following step E403, the total memory capacity ME is determined which is necessary for the decoding operations of a given number of elementary units of encoded data. These operations are described with reference to FIG. 3b.

This memory capacity is in particular that which is necessary for the storage of the macroblocks of decoded data for the purpose of viewing them, as explained above with reference to step E333 of FIG. 3b.

For example, the given number of macroblocks will correspond to the number of macroblocks which make up an image.

In the embodiment, the macroblocks making up an image are encoded in Intra mode or in Inter mode.

As the decoding of a macroblock which had been encoded in Inter mode requires the decoding of a difference macroblock encoded in Intra mode, the so-called elementary memory capacity required for decoding a macroblock encoded in Inter mode is greater than that required for decoding a macroblock encoded in Intra mode.

In the present case, the total memory capacity for decoding an image will be equal to that required to decode an image encoded in Inter mode in which all the macroblocks are encoded in Inter mode, which corresponds to the most unfavorable case.

This total memory capacity is supplied by the following equation:

$$ME=MB*ME_{Inter},$$

where MB is the number of macroblocks of an image and $ME_{Inter}$ is the estimation of the elementary memory capacity required for decoding the macroblock encoded in Inter mode.

The estimation of the elementary memory capacity $ME_{Inter}$ of a macroblock is carried out by determining the memory capacity required for constructing the compensated macroblock and the difference macroblock mentioned with reference to FIG. 3b.

The operations of decoding of the compensated macroblock described at steps E327, and E328 of FIG. 3b commence firstly by the statistical decoding of the differential movement vector.

The VLD statistical decoding (step E328) requires the putting into memory of the table defined in the standard *Information technology—Generic coding of audio-visual objects=part2: visual, ISO/IEC JTC 1/SC 29/WG*11 *N*3056, December 2000.

So as to be able to build the compensated macroblock at step E329, it is necessary beforehand to have stored the values of the macroblock of the preceding image in memory.

The decoding of the difference macroblock (E330) first of all makes provision for statistically decoding the coefficients according to step E321 of FIG. 3b (decoding in Intra mode).

The VLD decoding (step E328) requires the putting into memory of two tables defined in the standard *Information technology—Generic coding of audio-visual objects=part2: visual, ISO/IEC JTC 1/SC 29/WG11 N3056*, December 2000.

One of the tables corresponds to the coefficients of luminance and the other table to the coefficients of chrominance.

As for the inverse quantization described by step E323, this calls into play a weighting matrix W[l][u][v].

Furthermore, the reconstructed macroblock requires itself to be stored in memory until all the macroblocks of the image have been decoded.

The table below shows in a detailed manner the elementary memory capacity required for decoding a macroblock which had been encoded with the encoding mode using the most memory capacity, that is to say the Inter mode:

| Processing | Memory |
| --- | --- |
| VLD | 1112 |
| Macroblock of preceding image | 16 * 16 * 8 = 2048 |
| VLD luminance table | 218 |
| VLD chrominance table | 237 |
| Weighting matrix | 16 * 16 * 8 = 3072 |
| Saving of macroblock | 16 * 16 * 8 = 2048 |
| Total | 8735 |

In the example which has just been described, the total memory capacity for an image has been determined as a function of, on the one hand, the highest elementary memory capacity among the different elementary memory capacities determined for each of the encoding modes, and, on the other hand, the number of elementary units (macroblocks) making up the image.

The calculations making it possible to determine the total memory capacity ME are thus simplified.

However, it is also possible to provide for determining this total memory capacity ME as precisely as possible by taking into account, on the one hand the different elementary memory capacities which have been obtained respectively for the different encoding modes used, and on the other hand the number of elementary data units (macroblocks) encoded according to each of these encoding modes.

It should be noted that the number of different encoding modes may be greater than two, or even just one.

Returning to the algorithm of FIG. 4a, as soon as the total memory capacity ME has been determined, step E403 is followed by a step E404.

During this step, a test is carried out in order to determine whether the total memory capacity ME thus obtained for carrying out the decoding of an image forming part of a video requested by the user and encoded with the current encoding parameters is less than or equal to a predetermined memory capacity (M).

It should be noted that the current encoding parameters are, during the first execution of the loop of the algorithm, those Initialized at step E402.

Subsequently, the values of the parameters are supplied by steps E409 and E411.

In particular, a comparison is carried out between the memory capacity ME which has just been determined and the memory capacity M of the client machine 2 in order to ensure that the memory M of that client machine will be sufficient to store the video data required by the user and which must be decoded.

If this is the case, step E404 is followed by a step E405 during which the encoding of the video data is carried out according to the encoding parameters retrieved at step E400, as well as the current values of the number of images per second (fr) and of the resolution of the image (r), these values having been initialized at step E402.

During the following step E406, a decoding is carried out of the video data encoded during the execution of step E405, so as to obtain a version of the video in YUV format.

During the following step E407, a quantization is carried out of the quality of the video data thus compressed.

For example, the difference in quality between two videos will be estimated by using the concept of signal to noise ratio denoted PSNR ("Peak Signal to Noise Ratio") and supplied by the following equation:

$$PSNR = 10\log_{10}\left\{\frac{(2^Y)^2}{1/N\sum_{i=1}^{N}(q_i - p_i)^2}\right\}$$

where $q_i$ designates a pixel of the decoded image, $p_i$ a pixel of the original image, N the number of pixels of the image and Y the dynamic of the original signal, corresponding in the present case to eight bits.

The PSNR supplies a quantitative measurement of the quality of the reconstructed image. It is determined from the ratio of the maximum amplitude of the signal to the root mean square error.

It should be noted that other methods of estimating a quality can of course be envisaged.

It is thus, for example, possible to establish a model by determining the quality of different test videos for which the encoding parameter or parameters are varied.

Next, for each video to be transmitted, the encoding parameter or parameters are adapted according to the invention and, as a function of the type of video and of the aforementioned model, the quality of the video encoded with this parameter or parameters is derived therefrom.

With regard to the PSNR, it should be noted that the number of pixels of the original image must be the same as that of the decoded image.

However, this is not always true since the method according to the invention makes it possible to modify the encoding parameter consisting of the resolution of the image.

Consequently it will be necessary, in the event of any difference between the number of pixels in the original image and that of the decoded image, to introduce a spatial sub-sampling process, in order to take the resolution of the original image back to that of the decoded image.

The value of the PSNR is determined for each image of the video.

Thus a good-quality image will be obtained by basing the choice of the version of the data to be sent on the value of the PSNR.

It should be noted that it would be possible to determine the value of the PSNR for each elementary data unit constituting an image and then to add them in order to derive the value of the PSNR of the image in question.

By calculating the value of the PSNR on each elementary data unit (macroblock), macroblocks will be found which will be of good quality and others of less good quality and it will then be necessary to average the PSNR values of the macroblocks of the image.

This method however gives rise to more calculations than that consisting of calculating the value of the PSNR for the image in a global fashion.

Given that the concern is with the determination of the quality on a given video segment, a mean PSNR value will be calculated on this segment.

Consequently, a process of time sub-sampling will be used to take the number of images per second of the original video back to the number of images per second of the decoded image.

Once the mean quality of a given video segment has been estimated by comparing the decoded images of this segment which were previously encoded with the aforementioned encoding parameters with respect to the corresponding non-encoded images, there is stored, in the temporary storage unit 13 of FIG. 1, the mean PSNR value, and the digital data making up the compressed video with the current encoding parameters.

During the following step E408, a test is carried out in order to determine whether the current resolution of the image, r, corresponds to the last value appearing in the first table of the acceptable resolutions of the image.

If this is not the case, step E408 is followed by a step E409 during which the current resolution of the image is incremented to the following value appearing in the table in question.

It should be noted that, during the execution of the first loop of the algorithm in FIG. 4*a*, the value r initialized during step E402 corresponds to the first value of the first table and therefore this step E409 is executed.

The step E403 described above is then once again executed in order to determine the total memory capacity ME necessary for decoding the video data required by the user with the determined encoding parameters, having regard to the above.

The encoding parameter which corresponds to the resolution of the image has just been modified, whereas the other encoding parameter corresponding to the number of images per second remains, for its part, unchanged.

It will thus be understood that, during the execution of this loop of the algorithm, all the resolution values of the image indicated in the first table mentioned above are selected and, in each case, result in the determination of a particular memory capacity.

It should be noted that, in the example described here, only one encoding parameter is modified each time although it is also possible to have an influence on the other encoding parameter constituted by the number of images per second.

For this combination of encoding parameters in which only one parameter varies, the quality of each image and, more generally, of a given video data segment is estimated.

However, it could also be chosen to modify simultaneously several distinct encoding parameters within the same combination of encoding parameters and, for each combination of encoding parameters thus modified, the quality of the image is estimated.

It should be noted that, when step E404 is executed, if the test performed is negative, then step E404 is immediately followed by the step E408 described above.

In general terms, the algorithm in FIG. 4*a* makes it possible to take a decision to determine whether a encoding parameter can be used in order to encode the video data required by the user, having regard to:

the total memory capacity determined during step E403 as a function of this parameter, and the comparison of this memory capacity with a predetermined memory capacity (total memory capacity of the client machine 2) during step E404.

Returning to the algorithm in FIG. 4*a*, when the test performed at step E408 is positive, this means that all the values of image resolutions supplied by the aforementioned first table have been selected, then this step is followed by a step E410 during which another test is performed.

The purpose of this test is to determine whether the current value of the number of images per second (fr) corresponds to the last value of the aforementioned second table in which different values of the number of images per second are stored.

If this is not the case, this step is followed by a step E411 during which the current value of the number of images per second is incremented in order to select another value of the second table.

Step E403 is then once again executed and makes it possible to determine, for this new encoding parameter, the total memory capacity necessary for decoding the video data required by the user with this encoding parameter and the other aforementioned current encoding parameters.

It should be noted that, in this case, the value of the resolution of the image corresponds to the last value of the first table and that the different values of the number of images per second appearing in the second table will successively be selected, whilst the value of the resolution of the image will remain the same.

However, it is possible to envisage modifying the algorithm of FIG. 4*a* so that various other combinations of encoding parameters can be envisaged.

For example, the different successive values of the number of images per second appearing in the second table can be combined with the first and then the second value of the resolution of the image appearing in the first table.

It should also be noted that the first loop consisting of steps E403 to E409 could also take account of the encoding parameter constituted by the number of images per second of the video requested by the user instead of taking account of the resolution of the image.

Returning to step E410, when the test performed is positive, this means that all the values of the number of images per second appearing in the second table have been selected and the following step E412 is then passed on to.

During this step, a sorting is carried out in decreasing order of the different versions of the compressed video data according to their PSNR value.

For example, the compressed video data version which will be transmitted from the device 4 according to the invention to the client machine 2 of FIG. 1 will be the one which has the highest PSNR.

Step E412 selects the best quality among all those which have been determined.

This ends the algorithm of FIG. 4*a*.

It should be noted that step E209 of the algorithm of FIG. 2 is then executed in order to transmit the video data required by the user which have been adapted to the memory capacity of the client machine 2.

It should be noted that the algorithm of FIG. 4*a* can also take into account a single encoding parameter or, on the contrary, take account of other encoding parameters such as the number of images which have been encoded in Inter mode.

Thus one or more encoding parameters are adapted for the encoding of the video data or, more generally, multimedia data required by the user, in order for the client machine 2 to be capable of decoding these compressed data, having regard to the memory capacity available to the user.

The encoding parameter or parameters on which the invention acts must of course have an influence on the memory capacity necessary for the decoding of the multimedia data requested by the user.

It should be noted that, if two encoding modes participate in the encoding of the data, the invention makes it possible to be concerned with only one of the encoding parameters which exerts an influence on only one of the encoding modes.

Figure 4B:
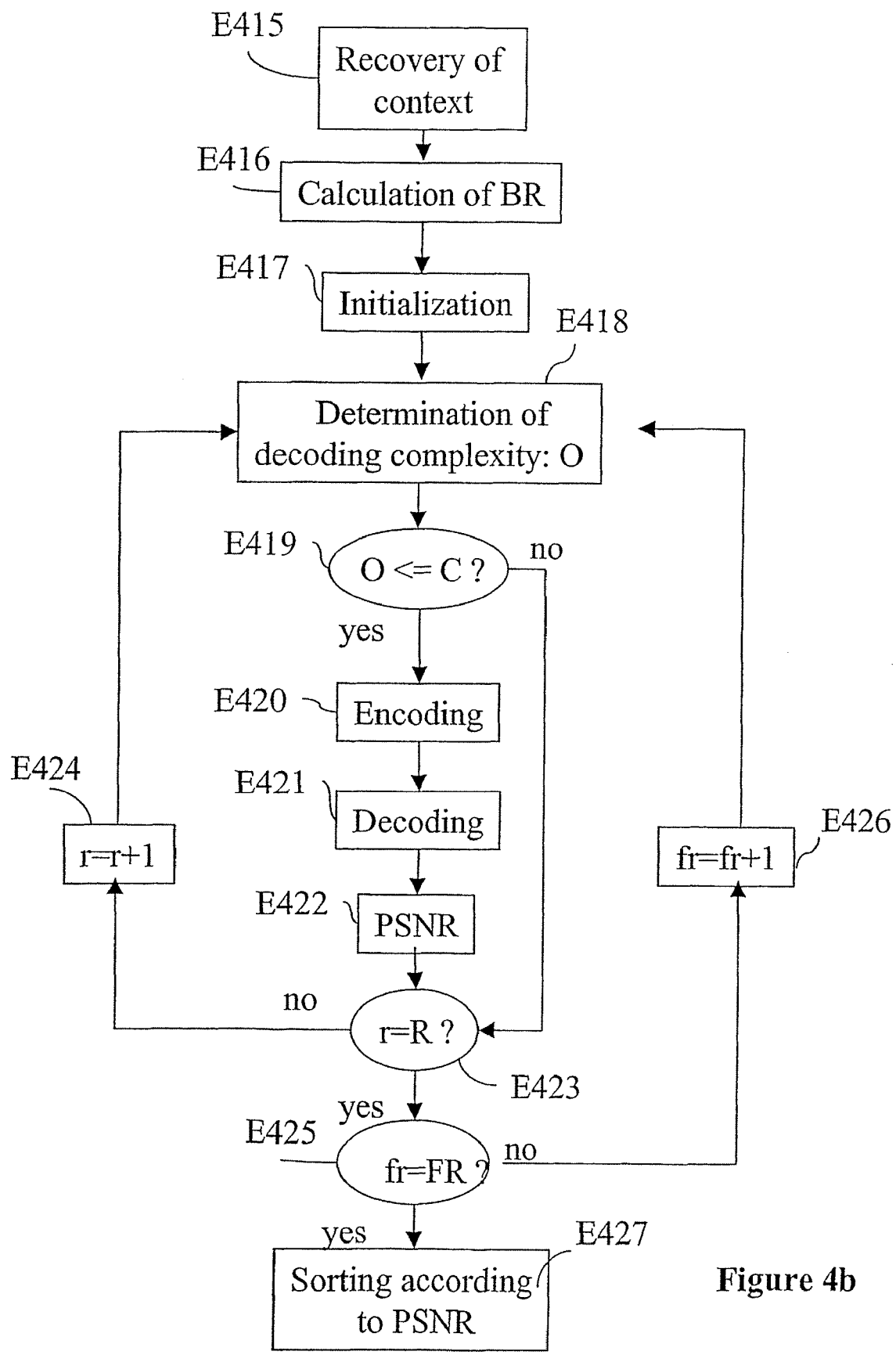
FIG. 4b shows an algorithm for determining at least one video data encoding parameter according to the second aspect of the invention and which corresponds to step E208 of the algorithm in FIG. 2.

FIG. 4b illustrates the algorithm detailing the different operations performed during step E208 of FIG. 2.

More particularly, this algorithm contains different instructions or portions of software code corresponding to steps of the data encoding parameter determination method according to the second aspect of the invention.

The computer program which is based on this algorithm is stored in the temporary data storage unit 13 of FIG. 1 and executed by the unit 17 under the control of the control unit.

This program forms part of the program "Progr" mentioned above with reference to FIG. 2 and is also stored in the apparatus of FIG. 5.

The execution of the computer program based on this algorithm will implement the method for adapting one or more encoding parameters which will be used for encoding the data transmitted to the client machine, according to the computational capacity of the latter (predetermined magnitude).

Moreover, this method can also make it possible to adapt this encoding parameter or parameters to the resolution of the screen of the client machine 2 and to the resources available on the communication network 3, namely the bandwidth.

The algorithm of FIG. 4b begins with a step E415 during which the context is retrieved in which the data will be transmitted from the device 4 of the server 1 to the client machine 2 (FIG. 1).

More particularly, the retrieval of this context consists of obtaining, from the temporary storage unit 13:

the computational capacity C of the client machine 2,
the resolution of the screen of this machine,
the bandwidth BP available on the communication network 3 for transmitting the video data, and
the encoding parameter or parameters used for encoding the video data stored in the storage unit 5.

The encoding parameters used are for example the size of the file containing the video data, denoted BRo, the resolution of the image ro and the number of images per second fro.

It should be noted that, when the video data are stored in the YUV format, the encoding parameters such as the size of the file, the resolution of the image and the number of images per second are necessarily retrieved during this step E415.

The other encoding parameters used for encoding these video data are then values which are chosen by default.

During the following step E416, the size of the video file BR which will be transmitted is determined.

During this step, two cases are envisaged depending on whether the size of the file BRo stored in the storage unit 5 of FIG. 1 is greater or lesser than the bandwidth available on the communication network 3.

For this purpose, account is taken of the value of the maximum rate BR allowed in the communication network 3 and which is allocated to the transmission rate control module during the execution of step E314 in FIG. 3a.

The size of the video file BR which it is possible to transmit is then supplied by the following equation:

$BR = \min(BRo, BP)$.

During the following step E417, the values contained in two tables are initialized: a first table, of size R, in which there are stored the acceptable resolution values of an image, and a second table, of size FR, in which there are stored different values of the number of images per second.

More particularly, the resolution values of the image which are contained in the first table are acceptable in so far as these resolution values are less than or equal to the resolution of the display unit 23 of the client machine 2 (FIG. 1) and which is stored in the storage unit 21.

A first table will for example be chosen whose first value is equal to the resolution of the video data stored in the storage unit 5 of FIG. 1 and constituting the original version of the video mentioned above, in the case, of course, where this value is considered to be acceptable.

The other acceptable values appearing in this table are selected first and, in the case where the dimension of the table is three, the last two values correspond to a resolution of 352 columns and 288 rows, in one case, and 176 columns and 144 rows in the other.

The second table containing different values of the number of images per second is for example also of dimension three and the first value of this table is equal to the number of images per second of the original version of the video stored in the storage unit 5 of FIG. 1.

The other two values are respectively equal to 20 and 10 images per second.

More particularly, during this step, two index variables, fr and r, corresponding respectively to the second and first table mentioned above, are initialized.

Each index variable is initialized to the first value contained in the corresponding table.

During the following step E418, a determination is made of the computational complexity, denoted O, of the process of decoding a sequence of images, also referred to as a segment of images and which corresponds to a number of images encoded for a predetermined interval of time.

In the example described here, the time resolution being an encoding parameter, the interval of time is fixed for example at 1 sec and the number of images encoded during this interval of time is counted.

The number of images is for example equal to thirty.

This computational complexity O is also referred to as the decoding complexity, and its determination corresponds to the determination of the total number of operations which are to be performed during a predetermined interval of time with a view to decoding a plurality of elementary encoded data units. These elementary units are for example the macroblocks defined above.

In order to determine this decoding complexity, a segment composed of $N_{Intra} + N_{Inter}$ images will be dealt with.

The complexity of such a segment is supplied by the following equation:

$$O = \left( N_{intra} * MB_{intra} * O_{intra} + \sum_{i=0}^{N_{inter}} (MB_{intra}^i * O_{intra} + MB_{inter}^i + O_{inter}), \right.$$

where:

$N_{Intra}$ is the number of images encoded in Intra mode for the segment in question, the segment corresponds to a given number of images per second, $N_{Inter}$ is the number of images encoded in Inter or predictive mode for the segment in question, $MB_{Intra}$ is the number of macroblocks encoded in Intra mode in an image encoded in Intra mode, $O_{Intra}$ is the decoding complexity of a macroblock encoded in Intra mode, $MB_{Intra}{}^i$ is the number of macroblocks encoded in Intra mode in an image encoded in Inter mode, $MB_{Inter}{}^i$ is the number of macroblocks encoded in Inter mode in an image encoded in Inter mode, and $O_{Inter}$ is the decoding complexity of a macroblock encoded in Inter mode.

It will thus be perceived that the determination of the decoding complexity of the image segment defined above is dependent on a prior step of analyzing the encoding mode used for encoding each elementary data unit (macroblock). Next it is a question of determining, for each elementary data unit which was encoded according to a different encoding mode, the decoding complexity of this elementary data unit, that is to say the elementary number of operations which it is necessary to perform to carry out its decoding.

The determination of the decoding complexity of the above-mentioned segment next comprises a step during which the number of elementary units of data encoded according to each of the different encoding modes is identified and, knowing the decoding complexity for each of these encoding modes, the total number of operations which it is necessary to perform during the predetermined interval of time in order to decode the plurality of elementary encoded data units constituting the segment defined above is deduced therefrom.

In the example described here, the encoding mode of an image is first looked at, and then, depending on whether this is encoded in Intra mode or Inter mode, the following procedure is carried out:

If the image is encoded in Intra mode, then it suffices to take into account the decoding complexity of a macroblock and the number of macroblocks contained in this image, and then to multiply the figure obtained corresponding to the decoding complexity of an image encoded in Intra mode by the number of images $N_{Inter}$ encoded according to this mode.

If the image is encoded in Inter mode, it is then necessary to seek, within each image, the number of macroblocks encoded according to the Intra or Inter encoding mode, and then to obtain for each image on the one hand the decoding complexity for the macroblocks encoded according to the Intra encoding mode and on the other hand the decoding complexity for the macroblocks encoded according to the Inter encoding mode.

It is then necessary to add these decoding complexities in order to obtain the total decoding complexity of an image encoded in Inter mode. It then remains to multiply this figure by the number of images encoded in $N_{Inter}$ mode.

It should be noted that the determination of the decoding complexity of an elementary data unit such as a macroblock varies according to whether the latter is encoded in Intra mode or in Inter mode.

As described below, the determination of the decoding complexity of an elementary data unit will be detailed depending on whether the encoding took place in Intra mode or in Inter mode.

1) Encoding in Intra Mode

With the decoding taking place data block by data block, the decoding complexity of a macroblock is equal to the complexity related to the decoding of the four blocks which make it up.

More particularly, the decoding complexity of a block is determined by counting the number of elementary operations participating in the various algorithms used in the decoding process.

The values of the complexity related to the DCT decoding are supplied by the article "*Fast Algorithms for the Discrete Cosine Transform*", E. Feig and S. Winograd, *IEEE Trans. On Signal Proc.*, vol. 40, No. 9, September 1992.

Table 1 below details the determination of the decoding complexity of the different algorithms which participate in the decoding of a block using the different elementary operations.

TABLE 1

| processing | test | Multiplication | Addition | Allocation |
|---|---|---|---|---|
| VLD | | | | 64 |
| Inverse Q | 192 | 256 | | 192 |
| Saturation | 128 | | 64 | |
| Control | 2 | | 64 | 65 |
| Inverse DCT | | 94 | 454 | 64 |
| Total | 322 | 350 | 582 | 385 |

Preferentially, all these operations are considered to be elementary except the multiplication, which is considered to be equivalent to two elementary operations.

Thus the total decoding complexity of a macroblock (luminance components) encoded in Intra mode is 4*1989=7956 elementary operations.

2) Encoding in Inter Mode

In the case where the macroblock is encoded in Inter mode, it is necessary to add, to the decoding complexity in Intra mode, the decoding complexity related on the one hand to the reconstruction of the movement vector from the differential movement vector which will be transmitted to the client machine 2 of FIG. 1 and on the other hand to the reconstruction of the macroblock (reconstruction of the difference macroblock and addition of this macroblock with the predicted macroblock).

The determination of the decoding complexity of these processes is detailed in Table 2 below which supplies, for each process, the number of elementary operations which participate.

TABLE 2

| Processing | test | multiplication | Addition | Allocation |
|---|---|---|---|---|
| VLD | | | | 2 |
| Reconstruction of movement vector | 7 | 5 | 13 | 11 |
| Reconstruction of difference macroblock | 1288 | 1400 | 2328 | 1540 |
| Construction of predicted macroblock | | | 512 | 256 |
| Reconstruction of macroblock | | | 256 | 256 |
| Total | 1295 | 1405 | 3109 | 2065 |

Thus, for the Inter or predictive mode, the total decoding complexity of a macroblock encoded in Inter mode is 7874 elementary operations.

Once the decoding complexity of a segment composed of $N_{Intra}+N_{Inter}$ images has been determined, step E418 is followed by a step E419.

During this step, a test is carried out in order to determine whether the decoding complexity thus determined for carrying out the decoding of a segment of the video requested by the user and encoded with the current encoding parameters is less than or equal to a predetermined decoding complexity.

It should be noted that the current encoding parameters are, during the first execution of the loop of the algorithm, those Initialized at step E417.

Subsequently, the values of the parameters are supplied by steps E424 and E426.

In particular, a comparison is carried out between the decoding complexity which has just been determined and the computational capacity C of the client machine 2 in order to ensure that the communication apparatus constituted by this client machine will be able to decode the video data required by the user.

If this is the case, step E419 is followed by a step E420 during which the encoding of the video data is carried out according to the encoding parameters retrieved at step E415, as well as the current values of the number of images per second (fr) and of the resolution of the image (r), these values having been initialized at step E417.

During the following step E421, a decoding is carried out of the video data encoded during the execution of step E420, so as to obtain a version of the video in YUV format.

During the following step E422, a quantization is carried out of the quality of the video data thus compressed.

For example, the difference in quality between videos will be estimated by using the concept of signal to noise ratio denoted PSNR ("Peak Signal to Noise Ratio") and supplied by the following equation:

$$PSNR = 10\log_{10}\left\{\frac{(2^Y)^2}{1/N \sum_{i=1}^{N} (q_i - p_i)^2}\right\}$$

where $q_i$ designates a pixel of the decoded image, $p_i$ a pixel of the original image, N the number of pixels of the image and Y the dynamic of the original signal, corresponding in the present case to eight bits.

The PSNR supplies a quantitative measurement of the quality of the reconstructed image. It is determined from the ratio of the maximum amplitude of the signal to the root mean square error.

It should be noted that other methods of estimating a quality can of course be envisaged.

It is thus, for example, possible to establish a model by determining the quality of different test videos for which the encoding parameter or parameters are varied.

Next, for each video to be transmitted, the encoding parameter or parameters are adapted according to the invention and, as a function of the type of video and aforementioned model, the quality of the video encoded with these parameter or parameters is derived therefrom.

With regard to the PSNR, it should be noted that the number of pixels of the original image must be the same as that of the decoded image.

However, this is not always true since the method according to the invention makes it possible to modify the encoding parameter consisting of the resolution of the image.

Consequently it will be necessary, in the event of any difference between the number of pixels in the original image and that of the decoded image, to introduce a spatial sub-sampling process, in order to take the resolution of the original image back to that of the decoded image.

The value of the PSNR is determined for each Image of the video.

Thus a good-quality image will be obtained by basing the choice of the version of the data to be sent on the value of the PSNR.

It should be noted that it would be possible to determine the value of the PSNR for each elementary data unit constituting an image and then to add them in order to derive the value of the PSNR of the image in question.

By calculating the value of the PSNR on each elementary data unit (macroblock), macroblocks will be found which will be of good quality and others of less good quality and it will then be necessary to average the PSNR values of the macroblocks of the image.

This method however gives rise to more calculations than that consisting of calculating the value of the PSNR for the image in a global fashion.

Given that the concern is with the determination of the quality on a given video segment, a mean PSNR value will be calculated on this segment.

Consequently, a process of time sub-sampling will be used to take the number of images per second of the original video back to the number of images per second of the decoded image.

Once the mean quality of a given video segment has been estimated by comparing the decoded images of this segment which were previously encoded with the aforementioned encoding parameters with respect to the corresponding non-encoded images, there is stored, in the temporary storage unit 13 of FIG. 1, the mean PSNR value, the digital data making up the compressed video with the current encoding parameters.

During the following step E423, a test is carried out in order to determine whether the current resolution of the image, r, corresponds to the last value appearing in the first table of the acceptable resolutions of the image.

If this is not the case, step E423 is followed by a step E424 during which the current resolution of the image is incremented to the following value appearing in the table in question.

It should be noted that, during the execution of the first loop of the algorithm in FIG. 4b, the value r initialized during step E417 corresponds to the first value of the first table and therefore this step E424 is executed.

The step E418 described above is then once again executed in order to determine the decoding complexity necessary for decoding the video data required by the user with the determined encoding parameters, having regard to the above.

The encoding parameter which corresponds to the resolution of the image has Just been modified, whilst the other encoding parameter corresponding to the number of images per second for its part remains unchanged.

It will thus be understood that, during the execution of this loop of the algorithm, all the resolution values of the image indicated in the first table mentioned above are selected and, in each case, result in the determination of a particular decoding complexity.

It should be noted that, in the example described here, only one encoding parameter is modified each time although it is also possible to have an Influence on the other encoding parameter constituted by the number of Images per second.

For this combination of encoding parameters in which only one parameter varies, the quality of each image and, more generally, of a given video data segment is estimated.

However, it could also be chosen to modify simultaneously several distinct encoding parameters within the same combination of encoding parameters and, for each combination of encoding parameters thus modified, the quality of the image is estimated.

It should be noted that, when step E419 is executed, if the test performed is negative, then step E419 is immediately followed by the step E423 described above.

In general terms, the algorithm in FIG. 4b makes it possible to take a decision to determine whether a encoding parameter can be used in order to encode the video data required by the user, having regard to:

the decoding complexity determined during step E418 as a function of this parameter, and the comparison of this decoding complexity with a predetermined decoding complexity (the computational capacity of the client machine 2) during step E419.

Returning to the algorithm in FIG. 4b, when the test performed at step E423 is positive, this means that all the values of image resolutions supplied by the aforementioned first table have been selected, then this step is followed by a step E425 during which another test is performed.

The purpose of this test is to determine whether the current value of the number of images per second (fr) corresponds to the last value of the aforementioned second table in which different values of the number of images per second are stored.

In the negative, this step is followed by a step E426 during which the current value of the number of images per second is incremented in order to select another value of the second table.

Step E418 is then once again executed and makes it possible to determine, for this new encoding parameter, the decoding complexity necessary for decoding the video data required by the user with this encoding parameter and the other aforementioned current encoding parameters.

It should be noted that, in this case, the value of the resolution of the image corresponds to the last value of the first table and that the different values of the number of images per second appearing in the second table will successively be selected, whilst the value of the resolution of the image will remain the same.

However, it is possible to envisage modifying the algorithm of FIG. 4b so that various other combinations of encoding parameters can be envisaged.

For example, the different successive values of the number of images per second appearing in the second table can be combined with the first and then the second value of the resolution of the image appearing in the first table.

It should also be noted that the first loop consisting of steps E418 to E424 could also take account of the encoding parameter constituted by the number of images per second of the video requested by the user instead of taking account of the resolution of the image.

Returning to step E425, when the test performed is positive, this means that all the values of the number of images per second appearing in the second table have been selected and the following step E427 is then passed to.

During this step, a sorting is carried out in decreasing order of the different versions of the compressed video data according to their PSNR value.

For example, the compressed video data version which will be transmitted from the device 4 according to the invention to the client machine 2 of FIG. 1 will be the one which has the highest PSNR.

Step E427 selects the best quality among all those which have been determined.

This ends the algorithm of FIG. 4b.

It should be noted that step E209 of the algorithm of FIG. 2 is then executed in order to transmit the video data required by the user which have been adapted to the computational capacity of the client machine 2.

It should be noted that the algorithm of FIG. 4b can also take into account a single encoding parameter or, on the contrary, take account of other encoding parameters such as for example the number of images which have been encoded in Inter mode.

Thus one or more encoding parameters are adapted for the encoding of the video data or, in more general terms, audio and/or video data required by the user, so that the client machine is able to decode these compressed data, having regard to its computational capacity.

The encoding parameter or parameters on which the invention acts must of course have an influence on the decoding complexity of the multimedia data required by the user.

It should be noted that, if two encoding modes participate in the encoding of the data, the invention makes it possible to be concerned with only one of the encoding parameters which exerts an Influence on only one of the encoding modes.

Figure 4C:
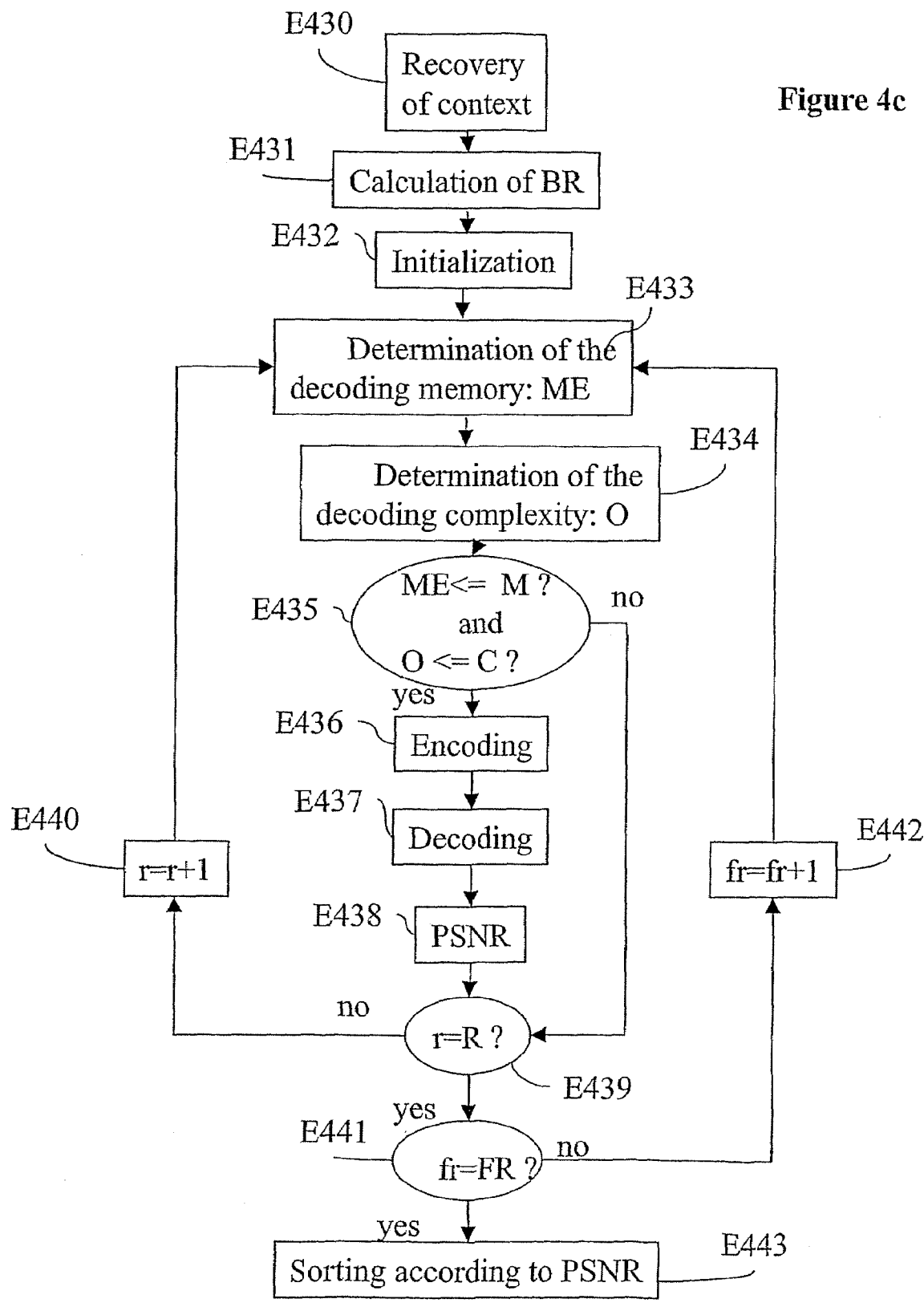

FIG. 4c shows a variant embodiment of the algorithm of FIG. 4a.

The algorithm of FIG. 4c differs from that of FIG. 4a on account of steps E430, E434 and E435 which will be detailed below.

As for steps E431, E432, E433 and E436 to E443, these correspond to the respective steps E401, E402, E403 and E405 to E412, and so will not be described again.

The algorithm of FIG. 4c comprises different instructions or portions of software code corresponding to steps of the method of determining a data encoding parameter according to the invention.

The computer program which is based on this algorithm is stored in the temporary data storage unit 13 of FIG. 1 and executed by the unit 17 under the control of the control unit 19.

This program forms part of the program "Progr" mentioned above with reference to FIG. 2 and is also stored in the apparatus of FIG. 5.

The execution of the computer program based on this algorithm will implement the method for adapting one or more encoding parameters which will be used for encoding the data transmitted to the client machine, as a function of, on the one hand, the memory capacity of the client machine (first predetermined magnitude), and, on the other hand, the computational capacity of the latter (second predetermined magnitude).

Moreover, this method can also make it possible to adapt this encoding parameter or parameters to the resolution of the screen of the client machine 2 and to the resources available on the communication network 3, namely the bandwidth.

On execution of the first step E430, the retrieval of the context in which the data will be transmitted from the device 4 of the server 1 to the client machine 2 (FIG. 1) comprises, in addition to that described at step E400 of FIG. 4a, the obtaining of the computational capacity C of the client machine 2.

During the step E434, the computational complexity, denoted O, is determined of the process of decoding a sequence of images, also referred to as a segment of images and which corresponds to a number of images encoded for a predetermined interval of time.

The operations performed during this step are the same as those mentioned above for the step E418 of FIG. 4b and, therefore, they will not be repeated here.

Once the decoding complexity of a segment composed of $N_{Intra}+N_{Inter}$ images has been determined, step E434 is followed by a step E435.

During this step, a test is carried out in order to determine, on the one hand, whether the total memory capacity ME obtained for carrying out the decoding of an image encoded with the current encoding parameters is less than or equal to a predetermined memory capacity M, and, on the other hand, whether the decoding complexity O obtained is less than or equal to a predetermined decoding complexity C.

The predetermined memory capacity and the predetermined decoding complexity correspond respectively, in the case of a client-server architecture, to the memory capacity available in the client machine 2 of FIG. 1 and to its computational capacity.

In so determining one or more encoding parameters in a manner adapted to this memory capacity available in the client machine 2 and to its computational capacity, the device 4 of FIG. 1 will be able to transmit to the machine 2 the data required by the user and encoded with this parameter or parameters, that is to say in a manner adapted to the characteristics of the machine 2 concerned above.

This adaptation of the content of the data transmitted takes the particularities of the client machine 2 more into account than the adaptation which is provided in FIG. 4a or in FIG. 4b.

With reference to FIG. 5, an example of a programmable apparatus implementing the invention is described. This apparatus is adapted to process multimedia digital data with a view to transmitting them.

According to the chosen embodiment shown in FIG. 5, an apparatus implementing the invention is for example a microcomputer 500 or a workstation connected to different peripherals, for example a moving image digital moving image camera 501 (or a scanner, or any means of acquiring or storing an image) connected to a graphics card and supplying to the apparatus data to be adapted and transmitted.

This apparatus comprises a device according to the invention or is the device itself.

In this respect, the apparatus comprises all the means which are necessary for implementing the invention (means of determining, means of deciding, means of comparing, means of obtaining, means of estimating, means of selecting, means of encoding, means of decoding).

The apparatus 500 comprises a communication bus 502 to which there are connected:
- a central processing unit 503 (microprocessor), which fulfills the function of the control unit 19 of FIG. 1,
- a read only memory 504, able to contain the program "Progr",
- a random access memory 506, containing registers 507 adapted to record variables created and modified during the execution of the aforementioned program and notably the variables r, fr, BR, $BR_o$ and PSNR mentioned with reference to the previous figures,
- a screen 508 for displaying the data to be processed and/or serving as a graphical interface with the user, who will be able to interact with the program according to the invention, using a keyboard 510 or any other means such as a pointing device, not shown, such as for example a mouse or light pen,
- a hard disk 512 able to contain the aforementioned program "Progr",
- a disk drive 514 adapted to receive a diskette 516 and to read or write thereon data processed or to be processed according to the invention,
- a communication interface 518 connected to a communication network 520, for example a network of the type Internet, Ethernet, or IEEE1394 or wireless type conforming to the 802.1 standard, the interface being capable of transmitting and receiving data.

In the case of audio data, the apparatus also comprises an input/output card connected to a microphone, neither of which is shown.

The communication bus allows communication and interoperability between the different elements included in the microcomputer 500 or connected to it. The representation of the bus is non-limiting and, notably, the central processing unit is able to communicate instructions to any element of the microcomputer 500 directly or by means of another element of the microcomputer 500.

The executable code of the program denoted "Progr" enabling the programmable apparatus to implement the methods of retrieving the context (FIG. 2), encoding/decoding (FIGS. 3a and 3b) and adapting (FIGS. 4a, 4b and 4c) the data according to the invention, can be stored for example on the hard disk 512 or in read only memory 504 as shown in FIG. 5.

Although only one program is identified, it is possible to have several programs or subprograms for implementing the invention.

According to a variant, the diskette 516 can contain compressed and stored data as well as the executable code of the program or programs according to the invention which, once read by the apparatus 500, will be stored in the hard disk 512.

As a second variant, the executable code of the program or programs can be received by means of the communication network 520, via the interface 518, in order to be stored in an identical fashion to that described previously.

The diskettes can be replaced by any information carrier such as a compact disc (CD-ROM) or a memory card. Generally, an information storage means, which can be read by a computer or microprocessor, integrated or not into the device, and which may possibly be removable, is adapted to store a program whose execution permits the implementation of the method according to the invention.

In more general terms, the program can be loaded into one of the storage means of the apparatus 500 before being executed.

The central processing unit 503 will control and direct the execution of the instructions or portions of software code of the program or programs according to the invention, instructions which are stored on the hard disk 512 or the read only memory 504 or in the other aforementioned storage elements. On powering up, the program or programs which are stored in a non-volatile memory, for example the hard disk 512 or the read, only memory 504, are transferred into the random access memory 506, which will then contain the executable code of the program or programs according to the invention, as well as registers for storing the variables necessary for implementation of the invention.

It should be noted that the data processing apparatus comprising a device according to the invention can also be a programmed apparatus.

This apparatus then contains the code of the computer program or programs for example fixed in an application specific integrated circuit (ASIC).

It should be noted that the apparatus in FIG. 5 which contains the program 'Progr' previously mentioned may, in the context of a communication architecture of the client-server type, be the device 4 in FIG. 1.

The invention claimed is:

1. A method of performing a digital transmission by transmitting encoded digital data to a client machine connected through a network, comprising the steps of:
   inputting digital data;
   detecting a computational capacity of a decoder in the client machine;
   determining an encoding parameter relating to an encoding format of the digital data, based on the computational capacity obtained in said detecting step;

encoding the digital data in accordance with the encoding parameter determined in said determining step; and transmitting the digital data encoded in said encoding step to the client machine.

2. A computer program stored on a computer-readable medium which can be loaded into a programmable apparatus, the computer program containing sequences of instructions or portions of software code for implementing the steps of the method of transmitting encoded digital data according to claim 1, when the computer program is loaded and executed by the programmable apparatus.

* * * * *